US007747350B2

(12) United States Patent
Matsuzaki et al.

(10) Patent No.: US 7,747,350 B2
(45) Date of Patent: Jun. 29, 2010

(54) ROBOT, HINT OUTPUT DEVICE, ROBOT CONTROL SYSTEM, ROBOT CONTROL METHOD, ROBOT CONTROL PROGRAM, AND INTEGRATED CIRCUIT

(75) Inventors: Natsume Matsuzaki, Osaka (JP); Kaoru Yokota, Hyogo (JP)

(73) Assignee: Panasonic Corporation, Osaka (JP)

( * ) Notice: Subject to any disclaimer, the term of this patent is extended or adjusted under 35 U.S.C. 154(b) by 762 days.

(21) Appl. No.: 11/578,196

(22) PCT Filed: Apr. 14, 2005

(86) PCT No.: PCT/JP2005/007201

§ 371 (c)(1),
(2), (4) Date: Oct. 11, 2006

(87) PCT Pub. No.: WO2005/099971

PCT Pub. Date: Oct. 27, 2005

(65) Prior Publication Data

US 2007/0213872 A1 Sep. 13, 2007

(30) Foreign Application Priority Data

Apr. 16, 2004 (JP) ............................ 2004-121556

(51) Int. Cl.
*G06F 19/00* (2006.01)
(52) U.S. Cl. ............. 700/245; 318/568.12; 318/568.13; 446/268
(58) Field of Classification Search ................. 700/245, 700/246, 248–250, 259; 701/23, 301; 901/1; 318/568.12; 340/436; 250/253; 706/13
See application file for complete search history.

(56) References Cited

U.S. PATENT DOCUMENTS

| 4,903,539 | A | * | 2/1990 | Toyoda et al. ............. 74/490.01 |
| 5,177,563 | A | * | 1/1993 | Everett et al. ................ 356/621 |
| 6,539,283 | B2 | | 3/2003 | Takagi |
| 6,587,751 | B2 | | 7/2003 | Takamura et al. |
| 6,711,467 | B2 | | 3/2004 | Inoue et al. |
| 2002/0024312 | A1 | * | 2/2002 | Takagi ................... 318/568.12 |
| 2002/0156751 | A1 | * | 10/2002 | Takagi et al. ................... 706/12 |
| 2003/0109959 | A1 | * | 6/2003 | Tajima et al. ................ 700/245 |
| 2003/0220796 | A1 | | 11/2003 | Aoyama et al. |
| 2006/0095160 | A1 | * | 5/2006 | Orita et al. .................. 700/248 |

FOREIGN PATENT DOCUMENTS

| JP | 10-234681 | 9/1998 |
| JP | 2001-277166 | 10/2001 |
| JP | 2002-178282 | 6/2002 |
| JP | 2003-255991 | 9/2003 |
| WO | 00/67961 | 11/2000 |

* cited by examiner

*Primary Examiner*—Khoi Tran
*Assistant Examiner*—Rodney King
(74) *Attorney, Agent, or Firm*—Wenderoth, Lind & Ponack, L.L.P.

(57) ABSTRACT

Conventional pet robots have the ability to distinguish users and take a different behavior pattern per each different user, and conventional pet robots have the ability to phase their behavior patterns based on their own behavior history to stage a growth process. The present invention provides an improvement to the conventional pet robots by, when in contact with a user in possession of a memory card, acquiring various types of information from the memory card, such as identification information of the memory card, information regarding the user, and history information regarding contact between the user and the robot. This provides the user a high degree of satisfaction by performing behavior that reflects the acquired information.

29 Claims, 23 Drawing Sheets

FIG. 7

| TRANSITION DESTINATION | | | | NODE A | | | | | |
|---|---|---|---|---|---|---|---|---|---|
| ACTION | INPUT EVENT | DATA NAME | RANGE | A | B | C | D | ... | Z |
| | | | | NODE A | NODE B | NODE C | NODE D | ... | NODE Z |
| | | | | (a) WAG TAIL | (b) TURN | (c) OUTPUT WHINING NOISE | (d) TURN HEAD | ... | (z) OUTPUT ANGRY NOISE |
| 1 | DETECT SOUND | SOUND | ≥ 3 | 20 (A1) | (B1) | (C1) | 50 (D1) | ... | (Z1) |
| 2 | PET | PRESSURE | < 2.0 | 70 (A2) | (B2) | 20 (C2) | (D2) | ... | (Z2) |
| 3 | HIT | PRESSURE | ≥ 2.0 | (A3) | 50 (B3) | (C3) | (D3) | ... | 30 (Z3) |
| 4 | FIND BALL | SIZE | DIAMETER < 1.0 | (A4) | (B4) | 45 (C4) | (D4) | ... | (Z4) |
| 5 | | JOY INDEX | ≥ 70 | 20 (A5) | (B5) | 5 (C5) | (D5) | ... | (Z5) |
| 6 | | FATIGUE INDEX | ≥ 50 | (A6) | 5 (B6) | 30 (C6) | 5 (D6) | ... | (Z6) |
| 7 | | ANGER INDEX | ≥ 60 | (A7) | 5 (B7) | (C7) | (D7) | ... | 60 (Z7) |
| ... | ... | ... | ... | ... | ... | ... | ... | | ... |

FIG. 9

PROBABILITY ADJUSTMENT TABLE A (SOMEWHAT AFFECTIONATE BEHAVIOR) — 161

| NODE NAME | ADJUSTMENT AMOUNT | | | | | | | |
|---|---|---|---|---|---|---|---|---|
| NODE A | (C1)+10 | (D1)−10 | (P1)−3 | (C2)+5 | (F2)−5 | ... | (S8)−5 |
| NODE B | (C2)+5 | (F2)−5 | — | — | — | ... | — |
| NODE C | (B3)−10 | (C3)+5 | (G3)+10 | (Z3)−5 | (t3)−7 | ... | (S2)−5 |
| ... | ... | ... | ... | ... | ... | ... | ... | ns
ROBOT, HINT OUTPUT DEVICE, ROBOT CONTROL SYSTEM, ROBOT CONTROL METHOD, ROBOT CONTROL PROGRAM, AND INTEGRATED CIRCUIT

BACKGROUND OF THE INVENTION

1. Field of the Invention

The present invention relates to a robot that performs behavior control which reflects information acquired from an external device.

2. Description of the Related Art

Recently, pet robots that operate autonomously depending on the surrounding environment, instructions from a user, and the like have been developed and sold. Patent document 1 discloses technology for phasing behavior levels in order to make operations of these pet robots more closely resemble actual pets. According to this technology, these pet robots phase from child-like behavior to adult behavior based on their own behavior histories and external input histories.

Patent document 2 discloses technology for modifying behavior patterns according to different users. According to this technology, the pet robot pre-stores behavior scheme data that corresponds to each of a plurality of users, identifies users by feature quantities such as sounds and facial images, and behaves in accordance with behavior scheme data that corresponds to the identified user.

Patent document 1: International Publication No. WO 00/67961

Patent document 2: Japanese Patent Application Publication No. 2001-277166

However, there is demand for a robot which can give the user a greater sense of satisfaction.

BRIEF SUMMARY OF THE INVENTION

In response to this demand, the present invention is a robot that behaves autonomously while in contact with a user, including a drive unit; a storage unit operable to store therein a plurality of pieces of control information that respectively define a plurality of behaviors of the robot; an acquisition unit operable to acquire, from a hint output device that gives a behavior hint to the robot, device hint information that suggests any one of the plurality of behaviors; a selection unit operable to select, from among the pieces of control information stored by the storage unit, a piece of control information that defines the behavior suggested by the acquired device hint information; and a drive control unit operable to control, based on the selected piece of control information, the drive unit such that the robot performs the behavior defined by the selected piece of control information.

According to this structure, the robot of the present invention performs behavior suggested by the device hint information. For this reason, the robot selects appropriate control information using simple hint information, and can perform behavior that satisfies the user without receiving detailed instructions.

BRIEF DESCRIPTION OF THE DRAWINGS

FIG. 2 is a block diagram showing a structure of a memory card 300a;

FIG. 7 shows details of a state transition table A 151;

FIG. 9 shows details of a probability adjustment table A 161;

FIG. 12 is a flowchart showing operations performed by a history management unit 106a of a virtual pet 100a regarding modifying a state transition table and updating a history file, being details of step S113 in FIG. 11 in a case of the virtual pet 100a;

DETAILED DESCRIPTION OF THE INVENTION

1. Embodiment 1

The following describes a virtual pet system 1 of embodiment 1, which is an example of the present invention.

1.1 Outline of the Virtual Pet System

Figure 1:
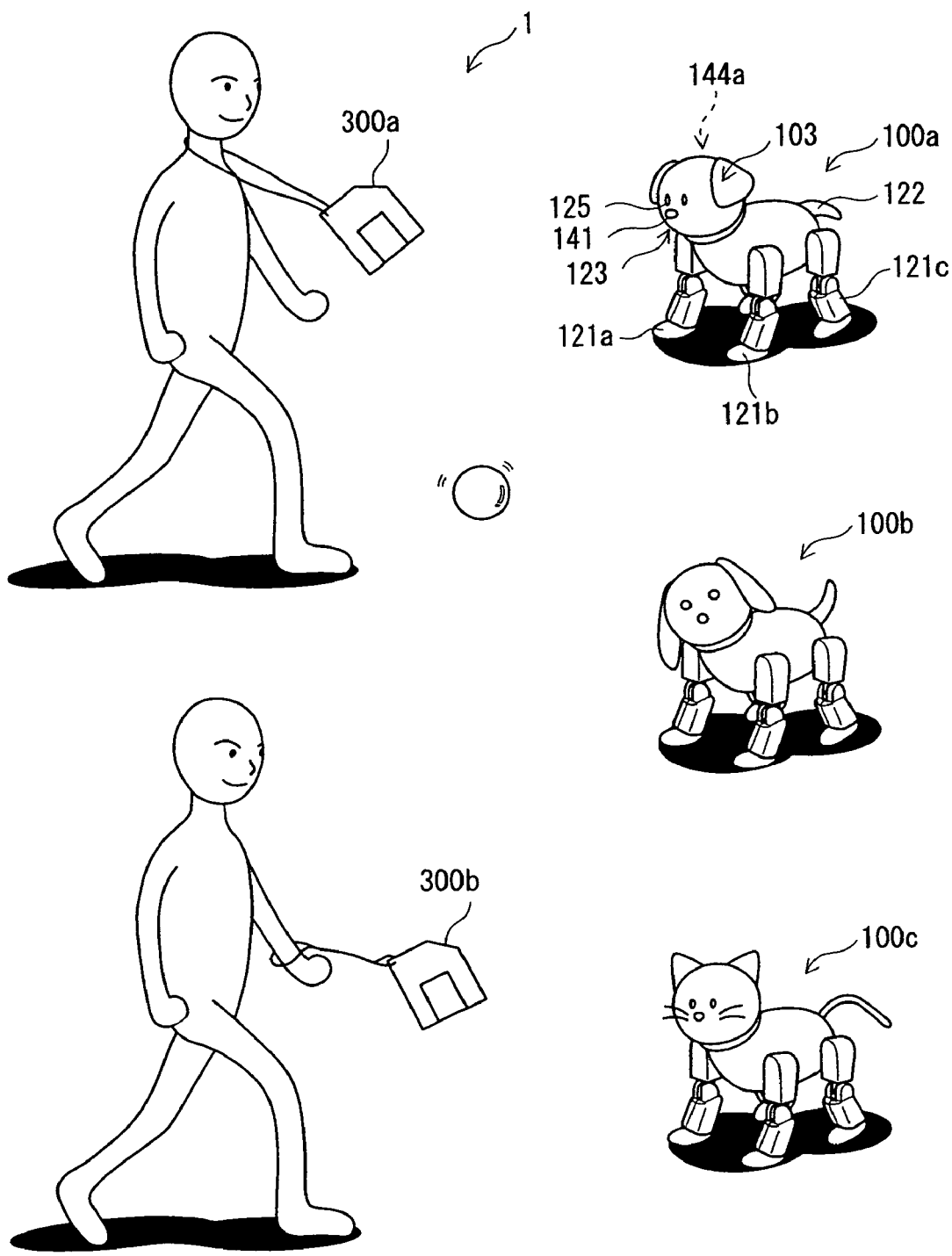
FIG. 1 is a structural diagram showing a structure of a virtual pet system 1.

As shown in FIG. 1, the virtual pet system 1 of the present invention is constituted from virtual pets 100a, 100b and 100c, and memory cards 300a and 300b.

As shown in FIG. 1, a user attaches the memory card 300a or 300b to his person and makes contact with a virtual pet.

The memory cards 300a and 300b are contactless IC cards which each store a unique card ID. The memory card 300b further stores a plurality of pet history tables. A pet history table shows a record of when the user in possession of the memory card 300b played with a virtual pet, and includes a pet ID indicating the virtual pet and a joy index which indicates a "happy/fun" emotion of the virtual pet at that time.

The virtual pets 100a and 100b are dog-type pet robots, while the virtual pet 100c is a cat-type pet robot. Hereinafter, the virtual pets 100a to 100c are generically called a virtual pet 100 when there is no particular need for distinction between them. The virtual pet 100 operates autonomously according to user behaviors such as petting, hitting and calling, as well as surrounding conditions such as temperature and illumination. Also, the virtual pet 100 can read information from the memory cards 300a and 300b, and write information to the memory card 300b.

When playing with the user in possession of the memory card 300b, the virtual pets 100a and 100c read pet history tables from the memory card 300b and change their behavior patterns based on the read pet history tables. For example, the virtual pets 100a and 100c read the joy index from the pet history table corresponding to their own pet ID, and behave with greater intimacy the higher the read joy index is. If there is no pet history table corresponding to their pet ID, the virtual pets 100a and 100c modify their behavior depending on a history of playing with a same type virtual pet, an elapsed time since playing with a different type of virtual pet, or the like.

Unlike the virtual pets 100a and 100c, the virtual pet 100b generates and stores a plurality of user history tables. A user history table shows a record of when a user in possession of a memory card played with the virtual pet 100b, and includes a card ID indicating the memory card and a joy index which indicates an emotion of the virtual pet 100b at that time.

When playing with the user in possession of the memory card 300a, the virtual pet 100b changes its behavior based on a stored user history table. Furthermore, when playing with the user in possession of the memory card 300b, the virtual pet 100b varies its behavior based on its stored user history table and a pet history table stored on the memory card 300b. For example, if the joy index in the user history table corresponding to the card ID indicated by the memory card 300b is high, but there is a pet history table indicating that the user has recently played with a different type of virtual pet, the virtual pet 100b will modify its behavior pattern to behave in a disagreeable manner.

1.2 Structure of the Memory Card 300a

The memory card 300a is a read-only contactless IC card.

Figure 2:
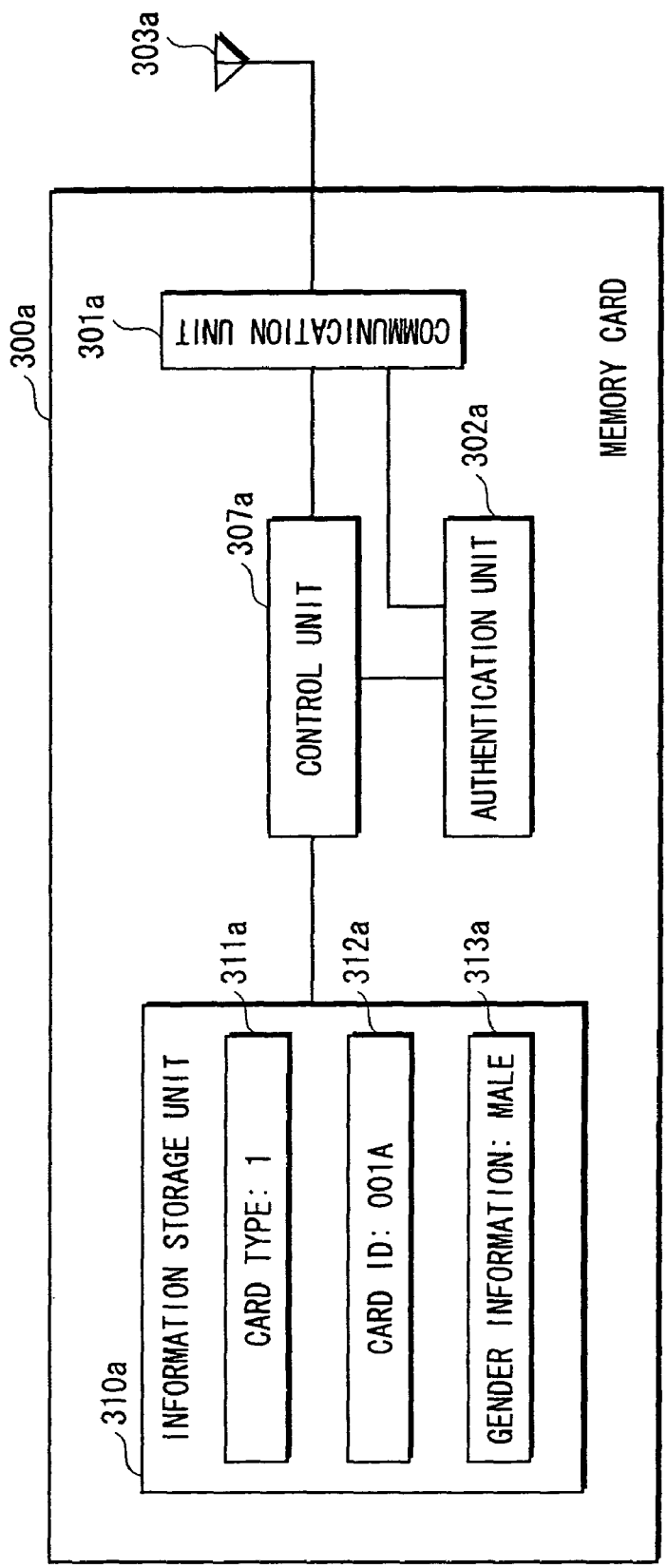

As shown in FIG. 2, the memory card 300a is constituted from a communication unit 301a, an antenna 303a, an authentication unit 302a, a control unit 307a and an information storage unit 310a. The following describes the constituent units of the memory card 300a.

(1) Information Storage Unit 310a

The information storage unit 310a is constituted from ROM, and stores a card type 311a, a card ID 312a and gender information 313a as shown in FIG. 2.

The card type 311a shows a memory card type, where "1" indicates read-only and "2" indicates that both reading and writing is possible. Here, the card type 311a "1" shows that the memory card 300a is read-only.

The card ID 312a is identification information unique to the memory card 300a.

The gender information 313a is a piece of information showing an attribute of the owner of the memory card 300a, and is either "male" or "female." Here, the gender information 313a shows that the gender of the owner of the memory card 300a is "male."

(2) Communication Unit 301a and Antenna 303a

The communication unit 301a performs transmission and reception, via the antenna 303a, of various types of information between an external device and the control unit 307a and authentication unit 302a.

(3) Authentication Unit 302a

The authentication unit 302a performs, via the communication unit 301a, device authentication with an external device in accordance with an instruction from the control unit 307a. One example of a device authentication method uses a challenge-and-response method. However, the authentication method is not limited to this method.

The authentication unit 302a allows communication between the control unit 307a and the external device if device authentication is successful, but prohibits communication if device authentication fails. Here, the external device is the virtual pet 100.

(4) Control Unit 307a

The control unit 307a receives challenge data from the virtual pet 100 via the communication unit 301a. When the challenge data is received, the control unit 307a outputs the received challenge data to the authentication unit and instructs device authentication.

The control unit 307a also receives an ID request from the virtual pet 100 via the communication unit 301a. When the ID request is received, the control unit 307a reads the card type 311a, the card ID 312a and the gender information 313a from the information storage unit 310a, and transmits the read gender information 313a to the virtual pet 100 via the communication unit 301a and the antenna 303a.

1.3 Structure of the Memory Card 300b

The memory card 300b is a readable/writable contactless IC card.

Figure 3:
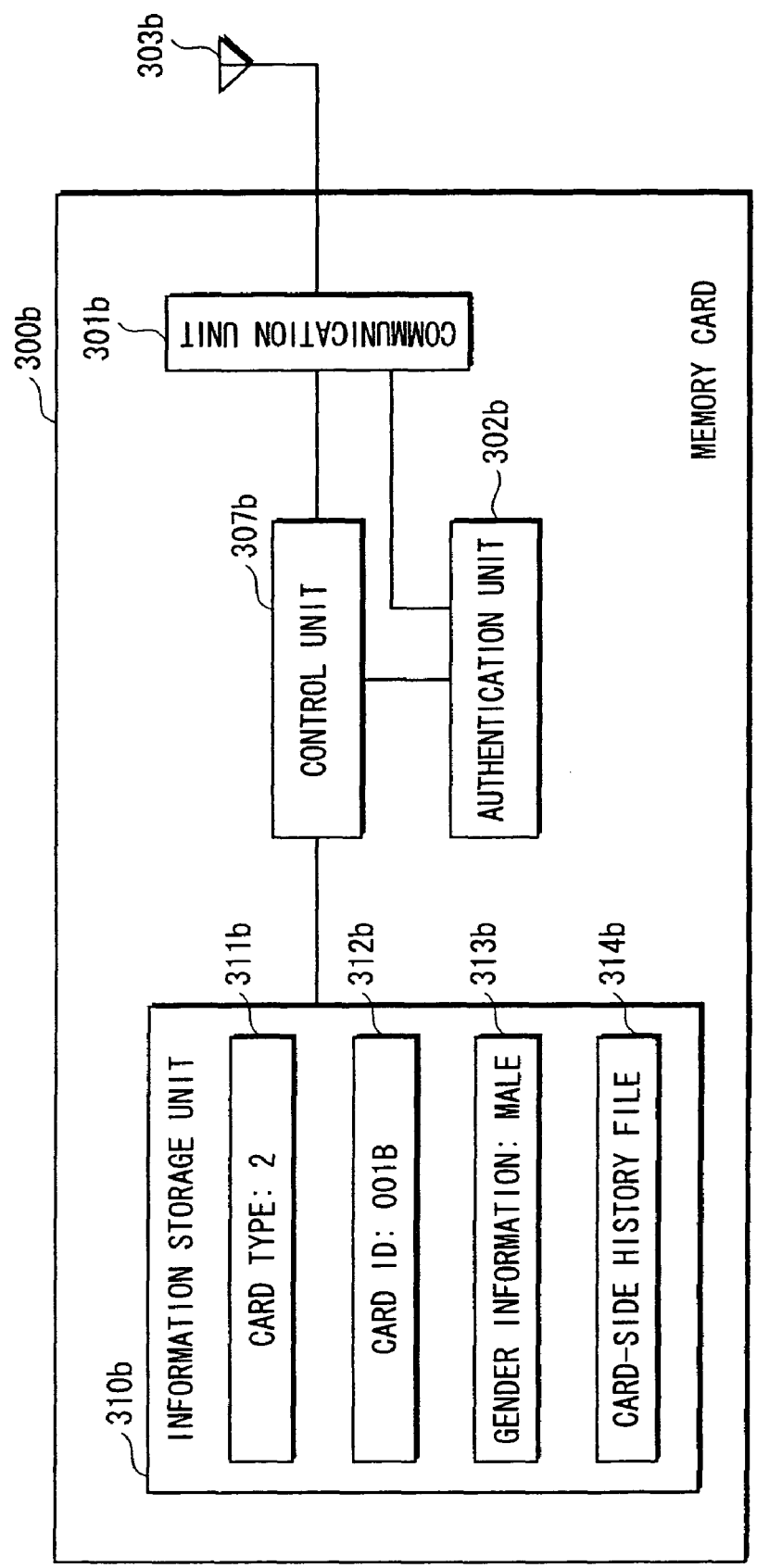
FIG. 3 is a block diagram showing a structure of a memory card 300b.

As shown in FIG. 3, the memory card 300b is constituted from a communication unit 301b, an antenna 303b, an authentication unit 302b, a control unit 307b and an information storage unit 310b. The following describes the constituent units of the memory card 300b. Note that descriptions of the communication unit 301b, the antenna 303b and the authentication unit 302b have been omitted since they are the same as the communication unit 301a, the antenna 303a and the authentication unit 302a included in the memory card 300a.

(1) Information Storage Unit 310b

A structure of the information storage unit 310b includes ROM and flash memory, and stores a card type 311b, a card ID 312b, gender information 313b and a card-side history file 314b as shown in FIG. 3.

The card type 311b, the card ID 312b and the gender information 313b are as previously described with the memory card 300a. Here, the card type 311b is "2", which indicates that the memory card 300b is readable and writable, and the gender information 313b shows that the gender of the owner of the memory card 300b is "male".

The card type 311b, the card ID 312b and the gender information 313b are stored in a portion of the information storage unit 310b constituted from ROM, and are written to the memory card 300b before being sold.

Figure 4:
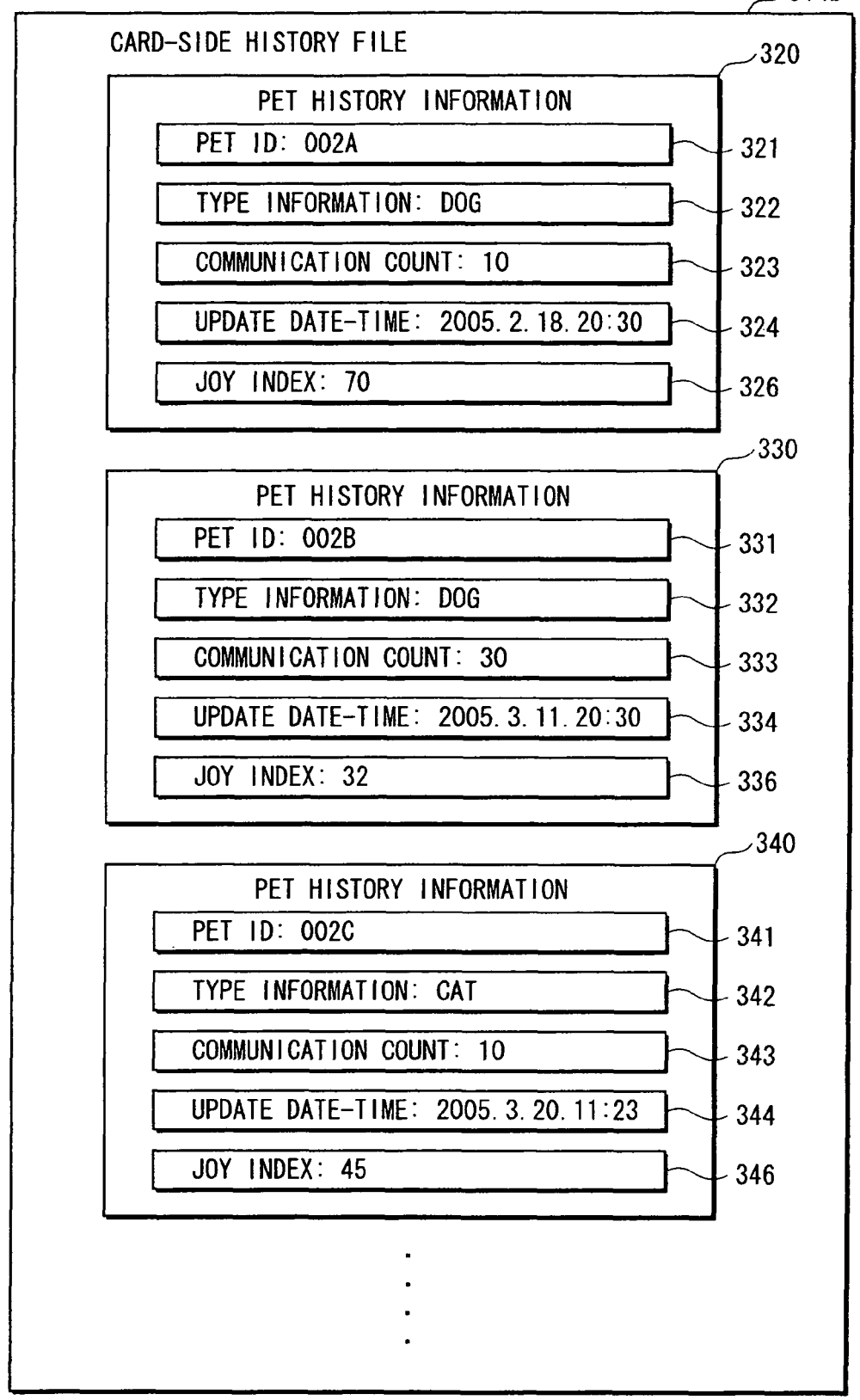
FIG. 4 shows details of a card-side history file 314b.

As shown in FIG. 4, the card-side history file 314b is constituted from a plurality of pet-side history tables 320, 330, 340 and so on. These pet-side history tables are stored in a portion of the information storage unit 310b constituted from flash memory, and are written to the memory card 300b by the virtual pet 100 after being sold.

A pet-side history table includes history information of when the user in possession of the memory card 300b played with a virtual pet, and is constituted from a pet ID, type information, a communication count, an update date-time and a joy index.

The pet ID is identification information which corresponds to a virtual pet the user in possession of the memory card 300b played with, and matches a pet ID of one of the virtual pets. The type information shows a type of the virtual pet corresponding to the pet ID. For example, the pet history table may include type information such as "dog", indicating a dog-type robot, and "cat", indicating a cat-type robot. The communication count shows a number of times the user in possession of the memory card 300b has played with the virtual pet shown by the pet ID. The update date-time shows the most recent date and time the user in possession of the memory card 300b played with the virtual pet shown by the pet ID. The joy index is an index indicating the "happy/fun" emotion of the virtual pet at that time, whereby a higher index value shows a greater level of fun felt (calculated) by the virtual pet. The joy index is described in detail in the description of the virtual pet 100.

(2) Control Unit 307b

Similarly to the control unit 307a of the memory card 300a, the control unit 307b instructs device authentication and transmits the card type 311b, the card ID 312b and the gender information 313b.

Additionally, the control unit 307b receives a history request and update information from the virtual pet 100 via the communication unit 301b. The history request requests transmission of a card-side history file, and the update information includes a pet ID, a current date-time, type information, a communication count and a joy index.

When the history request is received, the control unit 307b reads the card-side history file 314b from the information storage unit 310b, and transmits the read card-side history file 314b to the virtual pet 100 via the communication unit 301b.

When the update information is received, the control unit 307b searches within the card-side history file 314b for a pet history table that includes the pet ID included in the received update information. When the pet history table that includes the received pet ID is found, the control unit 307b updates the communication count, update date-time and joy index of the pet history file with the communication count, current date-time and joy index included in the received update information.

If a pet history table that includes the pet ID included in the received update information is not found, the control unit 307b generates a new pet history table based on the received update information. Here, the current date-time included in the received update information is made the update date-time in the pet history file. Next, the control unit 307b adds the generated pet history table to the card-side history file 314b.

When updating or generation of the pet history table ends, the control unit 307b transmits, via the communication unit 301b, a completion notification indicating that updating of the card-side history file has ended normally.

1.4 Virtual Pet 100

Figure 5:
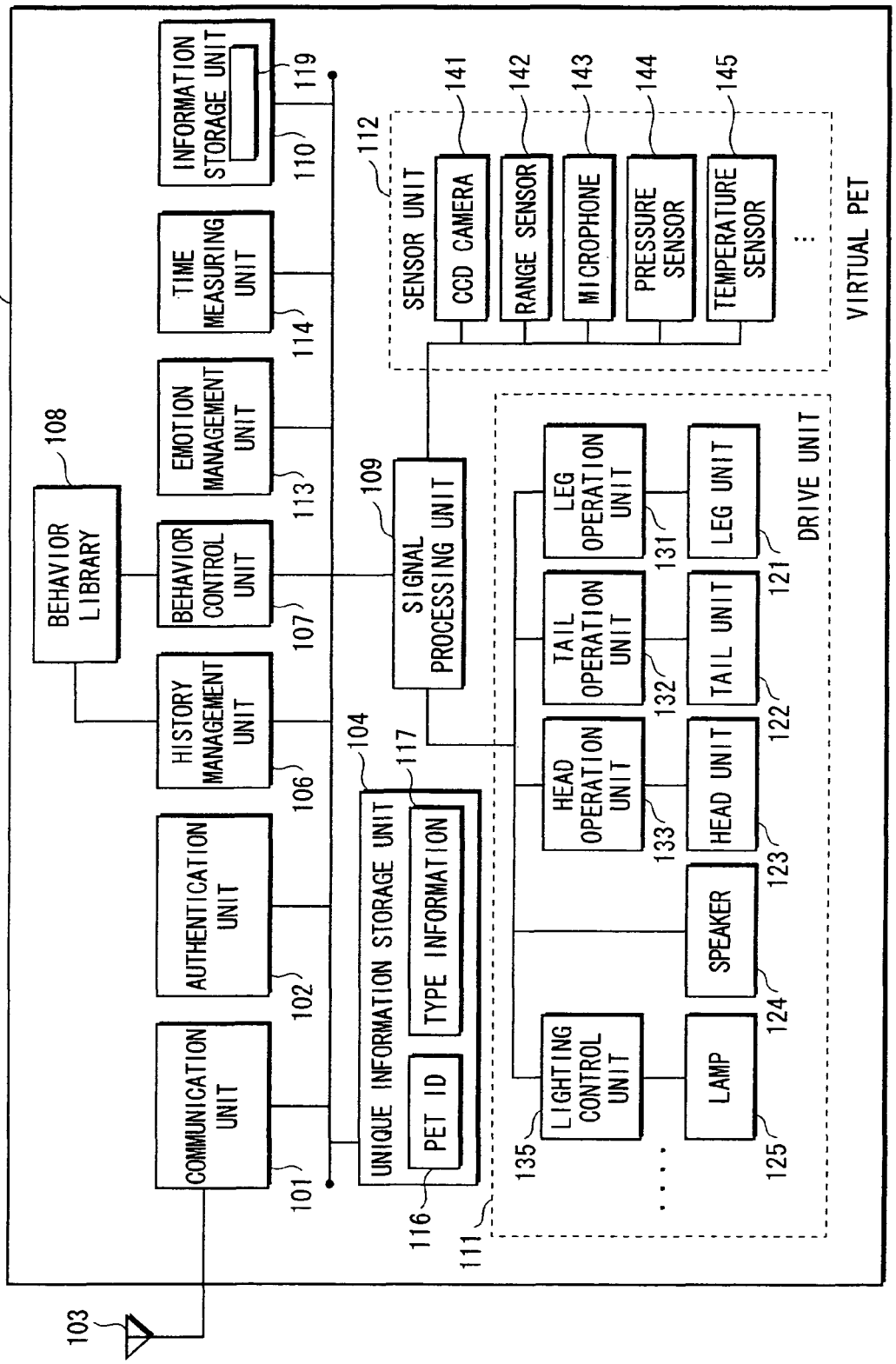
FIG. 5 is a block diagram showing structures of virtual pets 100.

As shown in FIG. 5, the virtual pet 100 is constituted from a communication unit 101, an authentication unit 102, a unique information storage unit 104, a history management unit 106, a behavior control unit 107, a behavior library 108, a signal processing unit 109, a drive unit 111, a sensor unit 112, an emotion management unit 113, a time measuring unit 114 and an information storage unit 110. Note that the information storage unit 110 is included in only the virtual pet 100b.

The communication unit 101, the authentication unit 102, the unique information storage unit 104, the behavior control unit 107, the behavior library 108, the signal processing unit 109, the drive unit 111, the sensor unit 112, the emotion management unit 113 and the time measuring unit 114 are included in the virtual pets 100a to 100c, and have the same structures and operations in each. Operations of the history management unit 106 differ between the virtual pet 100b and the virtual pets 100a and 100c. For the sake of convenience in the description, the history management units 106 included in the virtual pets 100a, 100b and 100c are noted as history management units 106a, 106b and 106c respectively.

The following first describes mutually common portions of the virtual pets 100a to 100c, and then portions differing between the virtual pet 106b and the virtual pets 100a and 100c.

Mutually Common Structure Portions (1) Unique Information Storage Unit 104

The unique information storage unit 104 is constituted from ROM and stores a pet ID 116 and type information 117. The pet ID 116 is identification information unique to the virtual pet 100, and the type information 117 shows which type the virtual pet 100 is. For example, type information "dog" is stored in the case of the virtual pets 100a and 100b which are dog-type pet robots, and type information "cat" is stored in the case of the virtual pet 100c which is a cat-type pet robot.

(2) Communication Unit 101 and Antenna 103

The communication unit 101 transmits and receives, via the antenna 103, various types of information between the memory card 300 and the history management unit 106 and the authentication unit 102. (In the following description, the memory cards 300a and 300b are generically called a memory card 300 when there is no particular need for distinction. In this case, the reference characters "a" and "b" are omitted from the constituent units of the memory card 300, as with the communication unit 101.)

(3) Authentication Unit 102

The authentication unit 102 performs device authentication with the authentication unit 302 of the memory card 300 via the communication unit 101. One example of a device authentication method uses a challenge-and-response method. However, the authentication method is not limited to this method.

The authentication unit 102 allows communication between the history management unit 106 and the memory card 300 if device authentication is successful, but prohibits communication if device authentication fails.

(4) Time Measuring Unit 114

The time measuring unit 114, which includes a crystal oscillator, measures elapsed time and calculates the current date and time.

(5) Signal Processing Unit 109, Drive Unit 111 and Sensor Unit 112

The sensor unit 112 specifically includes a CCD camera 141, a range sensor 142, a microphone 143, etc. at a front of a head unit of the virtual pet 100. The sensor unit 112 also includes a temperature sensor 145 and pressure sensors 144 that are provided in various units such as a head unit 123, a torso unit 126, and leg units 121 which constitute a body of the virtual pet 100.

The signal processing unit 109 receives various types of data, such as pressure data and sound data, from the sensor unit 112, and outputs the received data to the behavior control unit 107 and the emotion management unit 113. Furthermore, the signal processing unit 109 outputs the pressure data acquired from a pressure sensor 144a (shown in FIG. 1), which is included in the head unit 123, to the history management unit 106.

Also, the signal processing unit 109 receives operation instructions for constituent units of the drive unit 111 from the behavior control unit 107, and outputs the received operation instructions to these constituent units.

The drive unit 111 is constituted from leg operation units 131, leg units 121, a tail operation unit 132, a tail unit 122, a head operation unit 133, the head unit 123, speakers 124, lighting control units 135, lamps 125, etc.

As shown in FIG. 1, the body of a virtual pet 100 is constituted from the leg units 121, the tail unit 122, the head unit 123, etc., whereby the leg operation units 131, the tail operation unit 132 and the head operation unit 133 each include actuators for rotating and moving their corresponding units from front to back and side to side. The leg operation units 131, the tail operation unit 132 and the head operation unit 133 receive operation instructions from the signal processing unit 109 and operate the units in accordance with the received operation instructions.

The speakers 124 generate sounds in accordance with an operation instruction from the signal processing unit 109, and output the generated sounds. Here, the speakers 124 generate a number of types of sounds such as, for example, a whining noise, an angry noise, a tired noise, and a growling noise.

As shown in FIG. 1, the lamps 125 are provided in portions of the head unit 123 which corresponds to eyes, and include a plurality of lamps. The lighting control unit 135 receives an operation instruction from the signal processing unit 109, and lights, extinguishes or blinks the lamps 125 in accordance with the received operation instruction. Here, the color of the lit lamps expresses an emotion of the virtual pet (e.g., red for angry, green for happy, blue for sad), and the strength of the light and the blinking cycle vary depending on the intensity of the emotion.

Patent document 2 describes in detail this kind of operation control of autonomously operating pet robots and processing of data output by the sensors.

(6) Emotion Management Unit 113

The emotion management unit 113 includes a counter that quantifies virtual emotions such as happiness, sadness, anger and fatigue, and counts the resulting quantifications. Specifically, the emotion management unit 113 counts the joy index which indicates happiness and fun, an anger index that indicates anger, a fatigue index that indicates fatigue, and a sad index which indicates sadness.

Also, the emotion management unit 113 pre-stores types and values of data to be received, in association with types and values of indexes to be increased or decreased according to the received data.

The emotion management unit 113 receives various types of data such as pressure data, sound data, temperature data, and lighting data from the sensor unit 112 via the signal processing unit 109, and increases or decreases the indexes based on the received data. For example, if pressure data of 2.0 or more is received from the pressure sensor, that is, if the virtual pet is hit, 10 is added to the sad index, and 15 is subtracted from the joy index. If temperature data from the temperature sensor changes from below 15 degrees Celsius to 15 degrees Celsius or more, 10 is added to the joy index.

Also, the emotion management unit 113 acquires, from the behavior control unit 107, operation instructions output to the signal processing unit 109, and increases or decreases the indexes based on the acquired operation instructions. For example, the anger index is decreased by 2 when an operation instruction to output an angry noise is acquired. The joy index is increased by 3 when an operation instruction to move the tail unit from side to side is acquired.

Although the above description of virtual emotion control is an extremely simple model of control of virtual emotions, a method of controlling complex emotions using mathematical functions described in patent document 2 may be used.

Also, although only four indexes indicating emotions have been described, indexes for other emotions such as surprise and dislike, and indexes indicating physiological feelings such as appetite and a desire for exercise may be calculated.

(7) Behavior Library 108 and Behavior Control Unit 107

Figure 6:
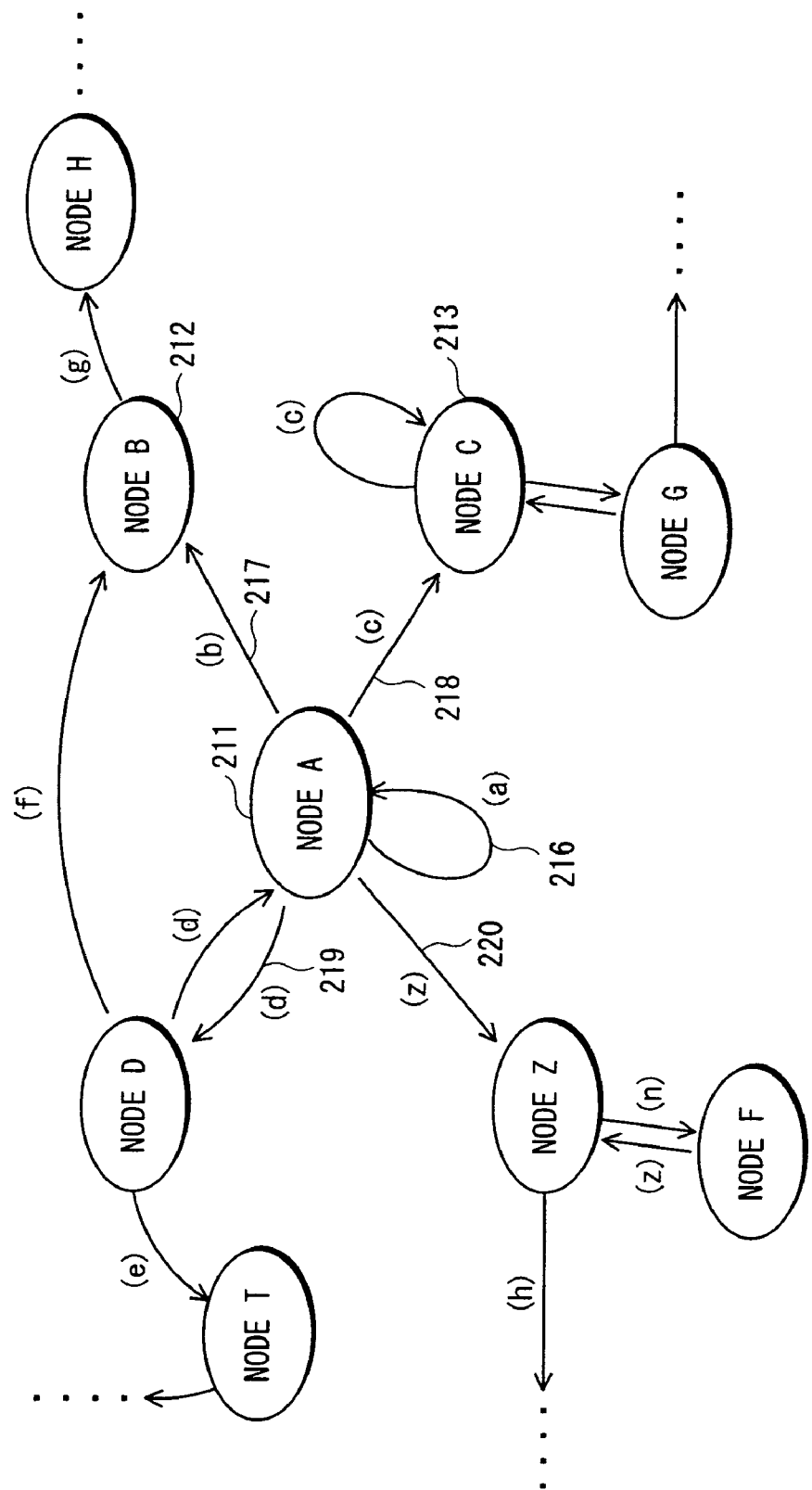
FIG. 6 shows an outline of a finite probability automaton.

The behavior control unit 107 controls behavior of the virtual pet 100 based on an algorithm called a finite probability automaton. FIG. 6 shows an example of this finite probability automaton. FIG. 7 shows an exemplary state transition table used by the behavior control unit 107 to realize control based on the finite probability automaton. The following describes behavior control based on the finite probability automaton using FIG. 6 and FIG. 7.

Nodes A 211, B 212, C 213, etc. shown in FIG. 6 each indicate a state of the virtual pet. For example, the states include standing (which is the basic posture), fallen, sitting, and so on. Arrows interconnecting the nodes show state transitions 216, 217, 218, etc. from node to node. Each state transition is assigned a predetermined probability (called a transition probability) in advance, whereby the behavior control unit 107 probabilistically determines a transition-destination node according to the transition probabilities. In the figure, (a), (b), (c), etc. are actions of the virtual pet 100 that accompany a state transition, and are the same as actions 236, 237, 238, etc. in FIG. 7 (described later).

The behavior control unit 107 uses state transition tables associated with the nodes to realize this kind of probabilistic state transition. FIG. 7 shows details of a state transition table A 151 associated with the node A 211, which is one of the state transition tables used by the behavior control unit 107. Here, the node A corresponds to the basic posture (standing and facing forward) state.

Transition destinations 231, 232, 233, etc. are arranged in a row direction in the state transition table A 151 shown in FIG. 7. These transition destinations are the names of nodes to be transitioned to from the node A. Indicated below the transition destinations are actions 236, 237, 238, etc. which are performed by the virtual pet when transitioning from the node A. Note that for the sake of convenience in the description, column letters A, B, C, etc. and row numbers 1, 2, 3, etc. are indicated in the row direction and the vertical direction respectively.

External input events 243, 244, etc., which are triggers for state transitions, are arranged in the vertical direction. Data names of specific data defining the input events are arranged in a column beside the input events, and the column beside that includes data ranges 245, etc. for triggering the state transitions. Data names 246, 247, 248, etc. show names of virtual emotion indexes which trigger state transitions in the absence of input events. The lower the row number of these input events and emotional indexes, the higher the priority. In other words, in the case of a simultaneous detection of both the input event 243 "DETECT SOUND" and the input event 244 "PET", the behavior control unit 107 employs the input event 243 "DETECT SOUND" as the trigger for state transition.

Transition probabilities are indicated in fields where columns with column letters and rows with row numbers intersect. Note that transition probabilities of "0%" are omitted. In order to facilitate understanding of the figure, the row number x and the column letter y are indicated as (xy) in fields, and fields are called cells (xy) hereinafter.

For example, column A includes the action 236 "(a) WAG TAIL" indicated below the transition destination 231 "node A"; row 1 includes the input event 243 "DETECT SOUND", the data name 241 "SOUND" and a range 245 "3 or more"; and cell (A1) includes a transition probability 251 "20". This shows that if a sound with a level of "3 or more" is detected, there is a 20% probability of a state transition to the node A, accompanied by the action "(a) WAG TAIL". (Here, a case of returning to the same node is also called a state transition.)

As another example, column C includes the transition destination 233 "node C" and the action 238 "(c) OUTPUT WHINING NOISE", row 6 includes the data name 247 "FATIGUE INDEX" and the range 250 "50 or more", and cell (C6) includes the transition probability 252 "30". This shows that if the fatigue index is "50" or more, there is a "30"% probability of a state transition to the node C, accompanied by the action "(c) OUTPUT WHINING NOISE".

Figure 8:
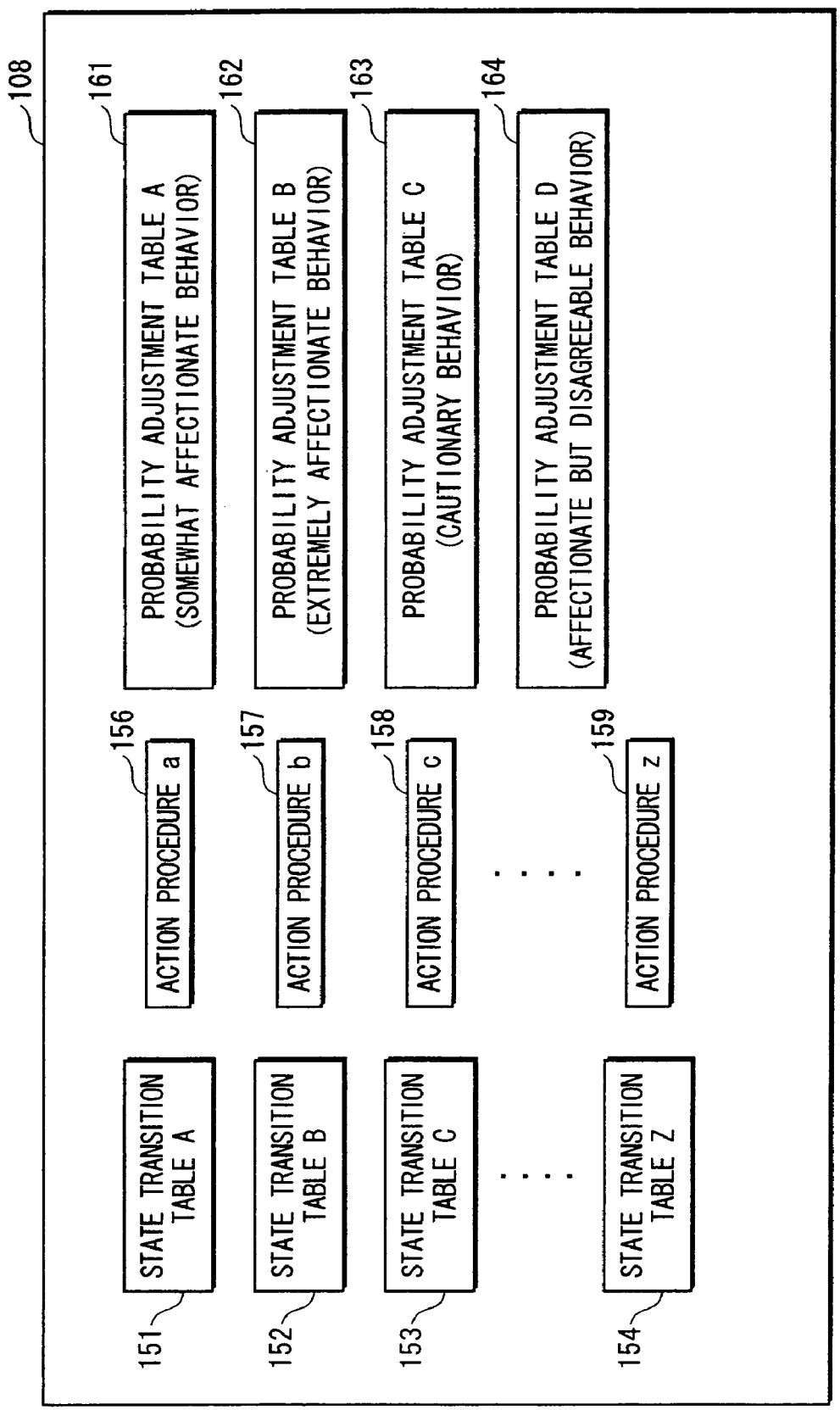
FIG. 8 shows information stored in a behavior library 108.

The behavior library 108 has a structure that includes ROM and RAM, and, as shown in FIG. 8, stores state transition tables A 151, B 152 . . . Z 154; action procedures a 156, b 157 . . . z 159; and probability adjustment tables A 161, B 162, C 163 and D 164.

The state transition tables A 151, B 152 . . . Z 154 correspond respectively to the node A, node B . . . node Z of the previously described finite probability automaton. The specific structures of the state transition tables are as described using FIG. 7.

The action procedures a 156, b 157 . . . z 159 include action procedures of the virtual pet 100 performed during state transitions, and correspond to the action 236 "(a) WAG TAIL", the action 237 "(b) TURN", and so on. For example, the action procedure a 156 includes a procedure of outputting to the tail action unit 132, via the signal processing unit 109, an action instruction to cause the tail unit 122 to move from side to side.

The probability adjustment tables A 161 to D 164 are used by the history management unit 106 when phasing behavior of the virtual pet 100, and define variation amounts for the transition probabilities of the state transition tables.

As one example, FIG. 9 shows a structure of the probability adjustment table A 161. The probability adjustment table A is constituted from node names 271, 272, 273, . . . , and corresponding adjustment amounts 276, 277, 278, . . . . The adjustment amounts include a plurality of variation amounts, and each variation amount is a value to be added to or subtracted from a transition probability included in a state transition table corresponding to a node name.

For example, the adjustment amount 276 which corresponds to the node name 271 "node A" includes a variation amount 281 "(C1) +10", a variation amount 282 "(D1) –10", and so on. Regarding the state transition table A 151 corresponding to "node A", the variation amount 281 "(C1) +10" shows that the value to be added to the transition probability of cell (C1) is "10", and the variation amount 282 "(D1) –10" shows that the value to be subtracted from the transition probability of cell (D1) is "10".

The probability adjustment tables B 162 to D 164 have a similar constitution.

If the transition probabilities of the state transition tables are modified based on the probability adjustment table A 161, there is a high probability that the virtual pet 100 will perform amiable actions such as wagging its tail, outputting a happy whining noise and snuggling, while there is a low probability that the virtual pet 100 will perform antagonistic actions such as outputting an angry noise and biting. Overall, the virtual pet 100 will behave in a somewhat affectionate manner.

If the transition probabilities of the state transition tables are modified based on the probability adjustment table B 162, there is an even higher probability that the virtual pet 100 will perform amiable actions, and will behave in an extremely affectionate manner.

If the transition probabilities of the state transition tables are modified based on the probability adjustment table C 163, there is a low probability that the virtual pet 100 will perform amiable actions, and there is a high probability of performing cautionary actions such as lowering its posture, outputting a growling noise, and moving away. Overall, the virtual pet 100 will behave in a cautious manner.

If the transition probabilities of the state transition tables are modified based on the probability adjustment table D 164, there is a high probability that the virtual pet 100 will perform a series of contradictory actions such as biting directly after outputting a happy whine, and outputting an angry noise directly after snuggling. Overall, the virtual pet will behave in an affectionate but disagreeable manner.

The behavior control unit 107 acquires various types of data such as pressure data, sound data, and temperature data from the sensor unit 112 via the signal processing unit 109. The behavior control unit 107 also regularly monitors the four emotion indexes counted by the emotion management unit 113.

When a power source of the virtual pet 100 is turned on, the behavior control unit 107 first reads the state transition table A 151. The behavior control unit 107 then determines a transition-destination node and an action to perform based on the read state transition table A 151, the received data, and the emotional indexes. The behavior control unit 107 outputs an action instruction to the drive unit 111 via the signal processing unit 109 in accordance with the action procedure corresponding to the determined action, and then reads the state transition table that corresponds to the node determined to be the transition destination.

Similarly, the behavior control unit 107 controls the behavior of the virtual pet 100 using the state transition tables A 151, B 152, . . . Z 154, and action procedures a 156, b 157, . . . z 159 which are stored in the behavior library 108.

If the history management unit 106 uses a probability adjustment table to increase or decrease the transition probabilities that constitute the state transition tables and modifies part of the state transition tables, the behavior control unit 107 continues to control behavior using the post-modification state transition tables.

In the following description, each movement defined by the action procedures a 156 to z 159 is called an "action," and a combination of successive actions of the virtual pet 100 which are executed using the state transition tables is called a "behavior."

Differing Structure Portion A

The following describes a history management unit 106a included in the virtual pet 100a.

(A1) History Management Unit 106a

The history management unit 106a included in the virtual pet 100a pre-stores a count threshold of "20", a joy threshold of "80", an idle period threshold of "7 days", a type history threshold of "50" and a cat contact threshold of "24 hours". These pieces of information are values that will be reference values which determine behavior toward the user in possession of the memory card 300, which may be extremely affectionate behavior, somewhat affectionate behavior, normal behavior, cautionary behavior, or extremely affectionate but disagreeable behavior. Here, normal behavior refers to how the virtual pet 100 behaves if behavior is controlled using the state transition table of the initial state.

Also, the history management unit 106a stores a transmission interval of "15 seconds". The transmission interval is an interval of time from transmitting update information (described later) to the readable/writable memory card 300b. Furthermore, the history management unit 106a includes a counter t which measures elapsed time.

The history management unit 106a acquires, via the signal processing unit 109, pressure data from a pressure sensor 144a included in the head unit 123. When the pressure data is acquired, the history management unit 106a instructs the authentication unit 102 to perform device authentication with the memory card 300. If the device authentication by the authentication unit 102 fails, further processing is canceled.

If the device authentication by the authentication unit 102 is successful, the history management unit 106a transmits to the memory card 300, via the communication unit 101, an ID request which requests transmission of a card ID. Next, the history management unit 106a receives a card type, the card ID and gender information via the communication unit 101. If the received card type is "1", which indicates a read-only card, the history management unit 106a does nothing.

If the received card type is "2", which indicates a readable/writeable card, the history management unit 106a transmits to the memory card 300 a history request which requests transmission of history information stored on the memory card 300. (The memory card that stores the card type "2" is the memory card 300b, and therefore the memory card 300b is used in the following.)

Next, the history management unit 106a receives a card-side history file from the memory card 300b. On receipt of the card-side history file, the history management unit 106a reads a pet ID 116 from the unique information storage unit 104, and searches the received card-side history file for a pet history table that includes the read pet ID 116. If a pet history table including the read pet ID 116 is found, the history management unit 106a reads a communication count from the pet history table, assigns a variable p a value of the communication count plus 1, and temporarily stores the variable p. The variable p is a variable for counting the number of communications between the memory card 300b and the virtual pet 100a. Next, the history management unit 106a modifies the transition probabilities of the state transition tables based on the found pet history table.

If none of the pet history tables includes the pet ID 116, the history management unit 106a assigns the variable p a value of 1, and temporarily stores the variable p. Next, the history management unit 106a modifies the transition probabilities of the state transition tables based on the received card-side history file and the type information of the virtual pet 100a.

When the transition probabilities of the state transition tables have been modified, the history management unit 106a then periodically transmits update information to the memory card 300.

The following explains in detail (A1-1) modification of transition probabilities based on a pet history table, (A1-2) modification of transition probabilities based on a card-side history file and type information, and (A1-3) transmission of update information, which have been outlined above.

(A1-1) Modification of Transition Probabilities Based on a Pet History Table

The history management unit 106a reads the communication count from the pet history table that was found. The history management unit 106a compares the communication count with the count threshold of "20". Furthermore, the history management unit 106a reads the joy index from the pet history table, and compares the joy index with the joy threshold of "80".

If a result of these comparisons is that the communication count is "20" or more and the joy index is "80" or more, the history management unit 106a reads the probability adjustment table B 162 from the behavior library 108, and increases or decreases the transition probabilities in the state transition tables A 151 to Z 154 using the read probability adjustment table B 162.

If the result of the comparisons is that the communication count is "20" or more and the joy index is less than "80", the history management unit 106a reads the probability adjustment table A 161 from the behavior library 108, and increases or decreases the transition probabilities in the state transition tables A 151 to Z 154 using the read probability adjustment table A 161.

If the result of the comparisons is that the communication count is less than "20" and the joy index is less than "80", the transition probabilities are not modified.

If the result of the comparisons is that the communication count is less than "20" and the joy index is "80" or more, the history management unit 106a reads the update date-time from the pet history table that was found. Next, the history management unit 106a acquires the current date-time from the time measuring unit 114, and calculates a difference between the acquired current date-time and the update date-time (the difference being called the idle period). If the idle period is within the idle period threshold of "7 days", the transition probabilities are modified using the probability adjustment table A 161.

If the idle period exceeds "7 days", the transition probabilities are not modified.

(A1-2) Modification of Transition Probabilities Based on a Card-Side History File and Type Information The history management unit 106a selects, from among the pet history tables which constitute the received card-side history file, pet history tables that include the same type information "dog" as the virtual pet 100a, and calculates a sum of the communication counts in the selected pet history tables (hereinafter, the calculated sum is called a D history index).

Next, the history management unit 106a selects pet history tables including type information "cat", which is different from its own type information "dog." The history management unit 106a extracts the most recent update date-time included in the selected pet history tables. (Hereinafter, the extracted update date-time is called a cat contact time.)

Next, the history management unit 106a acquires the current date-time from the time measuring unit 114, and subtracts the cat contact time from the acquired current date-time to calculate an elapsed time. If the elapsed time is less than the cat contact threshold of "24 hours", the history management unit 106a reads the probability adjustment table C 163 from the behavior library 108, and increases or decreases the transition probabilities in the state transition tables A 151 to Z 154 using the read probability adjustment table C 163.

If the calculated elapsed time is "24 hours" or more, the history management unit 106a next compares the calculated D history index and the type history threshold of "50". If the D history index is less than "50", the transition probabilities are not modified.

If the D history index is "50" or more, the history management unit 106a increases or decreases the transition probabilities in the state transition tables A 151 to Z 154 using the probability adjustment table A 161.

(A1-3) Transmission of Update Information

Next, the history management unit 106a initializes the counter t to "0", and begins measuring time. When the counter t reaches the transmission interval of "15 seconds", the history management unit 106a acquires the joy index from the emotion management unit 113, acquires the current date-time from the time measuring unit 114, and reads the pet ID 116 and the type information 117 from the unique information storage unit 104.

Next, the history management unit 106a transmits, via the communication unit 101, the read pet ID and type information, the acquired current date-time and the joy index, and the communication count. Here, the communication count is the variable p stored by the history management unit 106a. Hereinafter, these pieces of information which are transmitted to the memory card 300b are collectively called update information.

Next, the history management unit 106a measures an elapsed time from transmission of the update information. If a completion notification showing that the update information was received and the card-side history information was updated without error is received from the memory card 300b within a predetermined time period, the history management unit 106a initializes the counter t to "0", and repeats similar processing.

If the completion notification is not received within the predetermined time period, the history management unit 106a reverts the transition probabilities in the state transition tables A to Z stored in the behavior library 108 to their pre-modification states. (The history management unit 106a does nothing if the transition probabilities have not been modified.)

Although only the history management unit 106a included in the virtual pet 100a is described above, the structure and operations of the history management unit 106c included in the virtual pet 100c are substantially similar to the history management unit 106a. A description of the history management unit 106c is omitted since the cat contact threshold of "24 hours" need only be replaced with a dog contact threshold of "24 hours", and the type information "dog" need only be substituted with type information "cat".

Differing Structure Portion B

The following describes the information storage unit 110 and the history management unit 106b which are included in the virtual pet 100b.

(B1) Information Storage Unit 110

Figure 10:
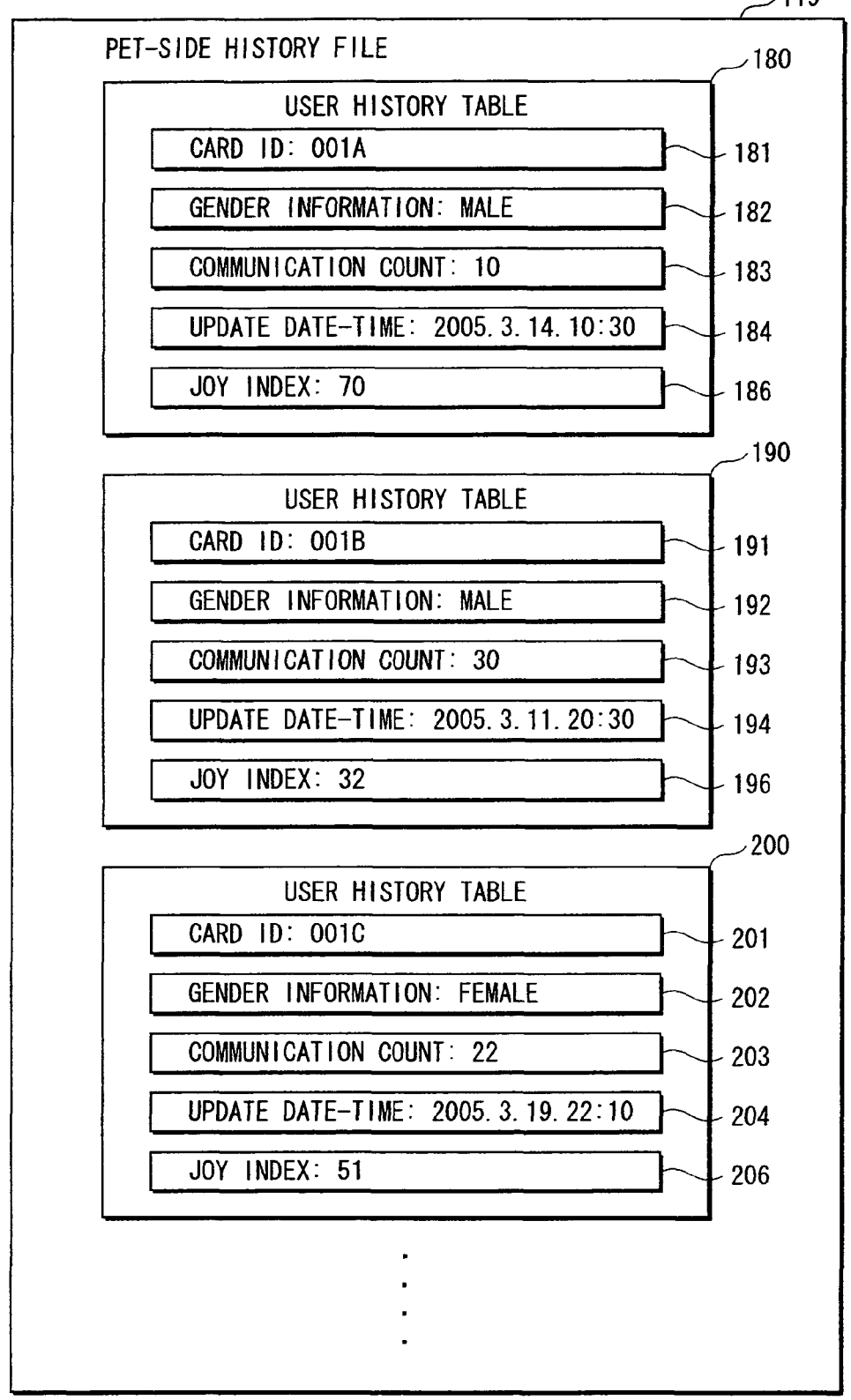
FIG. 10 shows details of a pet-side history file 119.

The information storage unit 110 is constituted from a writable and erasable recording medium such as flash memory, and stores, as one example, a pet-side history file 119 as shown in FIG. 10. As shown in FIG. 10, the pet-side history file 119 includes user history tables 180, 190, 200, and so on.

The user history tables include a card ID, gender information, a communication count, an update date-time and a joy index. This card ID is a piece of information that uniquely identifies the memory card that communicated with the virtual pet 100b, and is the same as the card ID stored on the memory card. The gender information indicates the gender of the owner of the memory card shown by the card ID, and matches the gender information stored on the memory card.

The communication count is a cumulative number of times the virtual pet 100b has communicated with the memory card shown by the card ID. The update date-time shows the most recent date-time of communication with the memory card. The joy index is a value counted, at the date-time shown by the update date-time, by the emotion management unit 113 when playing with the user who has the memory card.

For example, the user history table 180 includes a card ID 181 "001A", a gender information 182 "MALE", a communication count 183 "10", an update date-time 184 "2005.3.14.10:30" and a joy index 186 "70". This indicates that the virtual pet 100b has communicated with the memory card having the card ID "001A" and gender information "MALE" ten times in the past, of which the most recent communication was performed at "2005.3.14.10:30" (Mar. 14, 2005 10:30), at which the joy index of the virtual pet 100b was "70".

(B2) History Management Unit 106b

The history management unit 106b pre-stores a count threshold of "20", a joy threshold of "80", an idle period threshold of "7 days", a type history threshold of "50", a cat contact threshold of "24 hours" and a gender history threshold of "100". These pieces of information are values that will be reference values which determine behavior toward the user in possession of the memory card 300, which may be extremely affectionate behavior, somewhat affectionate behavior, normal behavior, cautionary behavior, or extremely affectionate but disagreeable behavior.

Also, the history management unit 106b stores a transmission interval of "15 seconds" and a contact interval of "60 seconds". The transmission interval is an interval of time from transmitting update information to the writable memory card 300b. The contact interval is a reference time period for judging if playing between the virtual pet 100b and the user in possession of the read-only memory card 300a has ended. Also, the history management unit 106b includes a counter t which measures elapsed time.

The history management unit 106b acquires, via the signal processing unit 109, pressure data from the pressure sensor 144a included in the head unit 123. On acquisition of the pressure data, the history management unit 106b instructs the authentication unit 102 to perform device authentication with the memory card 300. If the device authentication by the authentication unit 102 fails, further processing is canceled.

If the device authentication by the authentication unit 102 is successful, the history management unit 106b transmits to the memory card 300, via the communication unit 101, an ID request which requests transmission of the card ID. Next, the history management unit 106b receives the card type, the card ID and gender information via the communication unit 101.

(B2-1) Case of Card Type "1"

If the received card type is "1", which indicates a read-only card, that is to say, if the memory card is the memory card 300a, the history management unit 106b searches the pet-side history file 119 stored in the information storage unit 110 for a user history table that includes the received card ID.

If none of the user history tables includes the received card ID, the history management unit 106b modifies the transition probabilities in the state transition tables A 151 to Z 154 of the behavior library 108 based on the pet-side history file 119 and the received gender information.

If a user history table including the received card ID is found, the history management unit 106b modifies the transition probabilities in the state transition tables A 151 to Z 154 of the behavior library 108 based on the user history table that was found.

Upon modifying the transition probabilities, the history management unit 106b uses the counter t to judge whether the user in possession of the memory card 300a has stopped playing with the virtual pet 100b, and updates content of the pet-side history file 119 when playing has stopped.

The following describes in detail (B2-1-1) modification of transition probabilities based on a pet-side history file and gender information, (B2-1-2) modification of transition probabilities based on a user history table and (B2-1-3) judging an end of playing and updating of a pet-side history file.

(B2-1-1) Modification of Transition Probabilities Based on a Pet-Side History File and Gender Information The history management unit 106b selects, from the pet-side history file 119 stored in the information storage unit 110, user history tables that include gender information which matches with the received gender information. The history management unit 106b then calculates a sum of the communication counts included in the selected user history tables. (Hereinafter, the calculated sum is called a gender history index.)

Next, the history management unit 106b compares the calculated gender history index with the gender history threshold of "100". If the gender history index is 100 or more, the history management unit 106b reads the probability adjustment table A 161 from the behavior library 108, and modifies the transition probabilities in the state transition tables A 151 to Z 154 using the probability adjustment table A 161.

If the calculated gender index is less than 100, the history management unit 106b does nothing.

(B2-1-2) Modification of Transition Probabilities Based on a User History Table

The history management unit 106b uses the found user history table to judge whether to modify the transition probabilities and which probability adjustment table to use to modify the transition probabilities, and increases or decreases the transition probabilities of the state transition tables A to Z in accordance with the result of the judgment.

This processing is substantially the same as the previously described (A1-1) modification of transition probabilities based on a pet history table by the history management unit 106a included in the virtual pet 100a. The description is therefore kept brief since the pet history table need only be replaced with the user history table.

(B2-1-3) Judging an End of Playing and Updating a Pet-Side History File

Upon modifying the transition probabilities in the above process, the history management unit 106b initializes the counter t to "0", and begins measuring time. If pressure data is received, via the signal processing unit 109, from the pressure sensor 144a included in the head unit 123 within the contact interval of "60 seconds", the history management unit 106b initializes the counter t to "0". If pressure data is not received within "60 seconds", the history management unit 106b judges that playing has ended.

When playing is judged to have ended, the history management unit 106b acquires the joy index from the emotion management unit 113, and acquires the current date and time from the time measuring unit 114.

If the pet-side history file 119 does not include a user history table with the card ID received from the memory card 300a, the history management unit 106b generates a new user history table. Here, the card ID and gender information of the new user history table are made the received card ID and gender information. The communication count is given a value of "1". The update date-time includes the acquired current date and time, and the joy index is made the acquired joy index.

If a user history table including the card ID received from the memory card 300a is found in the pet-side history file 119, the history management unit 106b updates the update date-time of the user history table with the acquired current date and time, and updates the joy index with the acquired joy index. Next, the history management unit 106b adds 1 to the communication count.

When updating of the pet-side history file is finished, the history management unit 106b stops the counter t and reverts the transition probabilities of the state transition tables A 151 to Z 154 to their initial values.

(B2-2) Case of Card Type "2"

If the received card type is "2", which indicates a readable/writeable card, that is to say, if the memory card is the memory card 300b, the history management unit 106b transmits a history request to the memory card 300b via the communication unit 101. (The memory card with the stored card type of "2" is hereinafter referred to as the memory card 300b.) Next, the history management unit 106b receives a card-side history file from the memory card 300b. On receipt of the card-side history file, the history management unit 106b searches the pet-side history file 119 stored in the information storage unit 110 for a user history table that includes the received card ID.

If a user history table that includes the received card ID is not found, the history management unit 106b assigns the variable p a value of 1, and temporarily stores the variable p. The variable p is a variable for counting the communication count between the memory card 300b and the virtual pet 100b. Next, the history management unit 106b modifies the transition probabilities of the state transition tables A 151 to Z 154 based on the received card-side history file and the pet-side history table stored in the information storage unit 110.

If a user history table that includes the received card ID is found in the pet-side history file, the history management unit 106b reads the communication count from the user history table that was found, assigns the variable p a value of the communication count plus 1, and temporarily stores the variable p. Next, the history management unit 106b modifies the transition probabilities of the state transition tables A 151 to Z 154 based on the card-side history file acquired from the memory card 300b and the user history table.

The history management unit 106b periodically transmits update information when modification of the transition probabilities is finished. The history management unit 106b judges that the user in possession of the memory card 300b has finished playing with the virtual pet 100b when there is no longer any response to the transmission of the update information, and updates the pet-side history file.

The following explains in detail (B2-2-1) modification of transition probabilities based on a card-side history file and a pet-side history file, (B2-2-2) modification of transition probabilities based on a card-side history file and a user history table, (B2-2-3) transmission of update information, and (B2-2-4) updating of a pet-side history file, which are outlined above.

(B2-2-1) Modification of Transition Probabilities Based on a Card-Side History File and a Pet-Side History File The history management unit 106b selects, from the received card-side history file, pet history tables that include the same type information "dog" as the virtual pet 100b. The history management unit 106b adds all the communication counts included in the selected pet history tables to calculate the D history index.

Next, the history management unit 106b selects, from the received card-side history file, pet history tables that include the type information "cat", and extracts the most recent update date-time included in the selected pet history tables (hereinafter, called the cat contact time). The history management unit 106b then acquires the current time from the time measuring unit 114, and calculates the elapsed time by subtracting the cat contact time from the acquired current time.

Next, the history management unit 106b selects, from the pet-side history file 119 stored in the information storage unit 110, user history tables that include the same gender information as the received gender information. The history management unit 106b adds all the communication counts included in the selected user history tables to calculate the gender history index.

Next, the history management unit 106b compares the calculated elapsed time and the cat contact threshold of "24 hours", and increases or decreases the transition probabilities of the state transition tables A to Z using the probability adjustment table C 163 if the elapsed time is less than "24 hours".

If the calculated elapsed time is "24 hours" or more, the history management unit 106b further compares the calculated gender history index and the gender history threshold of "100", and compares the calculated D history index and the type history threshold of "50".

If the gender history index is "100" or more, and the D history index is "50" or more, the history management unit 106b increases or decreases the transition probabilities of the state transition tables A 151 to Z 154 using the probability adjustment table B.

If the gender history index is "100" or more and the D history index is less than "50", or if the gender history index is less than "100" and the D history index is "50" or more, the history management unit 106b increases or decreases the transition probabilities of the state transition tables A 151 to Z 154 using the probability adjustment table A.

If the gender history index is less than "100" and the D history index is less than "50", the transition probabilities are not modified.

(B2-2-2) Modification of Transition Probabilities Based on a Card-Side History File and a User History Table The history management unit 106b selects pet history tables including the type information "cat" from the received card-side history file, and extracts the most recent update date-time included in the selected pet history tables (hereinafter, called the cat contact time). Next, the history management unit 106b acquires the current time from the time measuring unit 114, and subtracts the cat contact time from the current time to calculate the elapsed time.

Next, the history management unit 106b reads the communication count from the user history table found in the pet-side history file 119, and compares the communication count with the count threshold of "20".

If the communication count is "20" or more, the history management unit 106b reads the joy index from the user history table that was found, and compares the joy index with the joy threshold of "80". If the joy index is less than "80", the history management unit 106b increases or decreases the transition probabilities of the state transition tables A 151 to Z 154 using the probability adjustment table A 161.

If the joy index is "80" or more, the history management unit 106b further compares the calculated elapsed time and the cat contact threshold of "24 hours", and increases or decreases the transition probabilities of the state transition tables A to Z using the probability adjustment table D 164 if the elapsed time is less than "24 hours". If the elapsed time is "24 hours" or more, the history management unit 106b increases or decreases the transition probabilities of the state transition tables A to Z using the probability adjustment table B 162.

If the communication count is less than "20", the history management unit 106b then compares the calculated elapsed time and the cat contact threshold of "24 hours", and increases or decreases the transition probabilities of the state transition tables A to Z using the probability adjustment table C 163 if the elapsed time is less than "24 hours".

If the elapsed time is "24 hours" or more, the history management unit 106b reads the update date-time from the user history table that was found. The history management unit 106b then acquires the current date-time from the time measuring unit 114, and subtracts the read update date-time from the acquired current date-time to calculate the idle period. If the calculated idle period is less than the idle period threshold of "7 days", the history management unit 106b increases or decreases the transition probabilities of the state transition tables A to Z using the probability adjustment table A 161. If the idle period is greater than or equal to the idle period threshold of "7 days", the transition probabilities are not modified.

(B2-2-3) Transmission of Update Information

Upon finishing modifying the transition probabilities, the history management unit 106b uses the counter t to periodically transmit update information to the memory card 300b, and judges playing to be finished when there is no response to the transmission. A description of the specific processing sequence is omitted since it is similar to the process (A1-3) transmission of update information, which is carried out by the history management unit 106a included in the virtual pet 100a.

(B2-2-4) Update of a Pet-Side History File

When playing is judged to be finished, the history management unit 106b acquires the joy index from the emotion management unit 113, and the current date-time from the time measuring unit 114.

If the pet-side history file does not include a user history table with the card ID received from the memory card 300a, the history management unit 106b generates a new user history table. Here, the received card ID and gender information are used as the card ID and gender information of the new user history table. The communication count is given a value of "1". The update date-time is made the acquired current date-time, and the joy index is made the acquired joy index.

If the pet-side history file includes a user history table with the card ID received from the memory card 300a, the history management unit 106b updates the update date-time of the user history table with the acquired current date-time, and updates the joy index with the acquired joy index. The history management unit 106b next adds 1 to the communication count.

Upon finishing updating the pet-side history file, the history management unit 106b stops the counter t, and returns the transition probabilities of the state transition tables A 151 to Z 154 to their initial values.

1.5 Operations (1) Operations of the virtual pet 100

Figure 11:
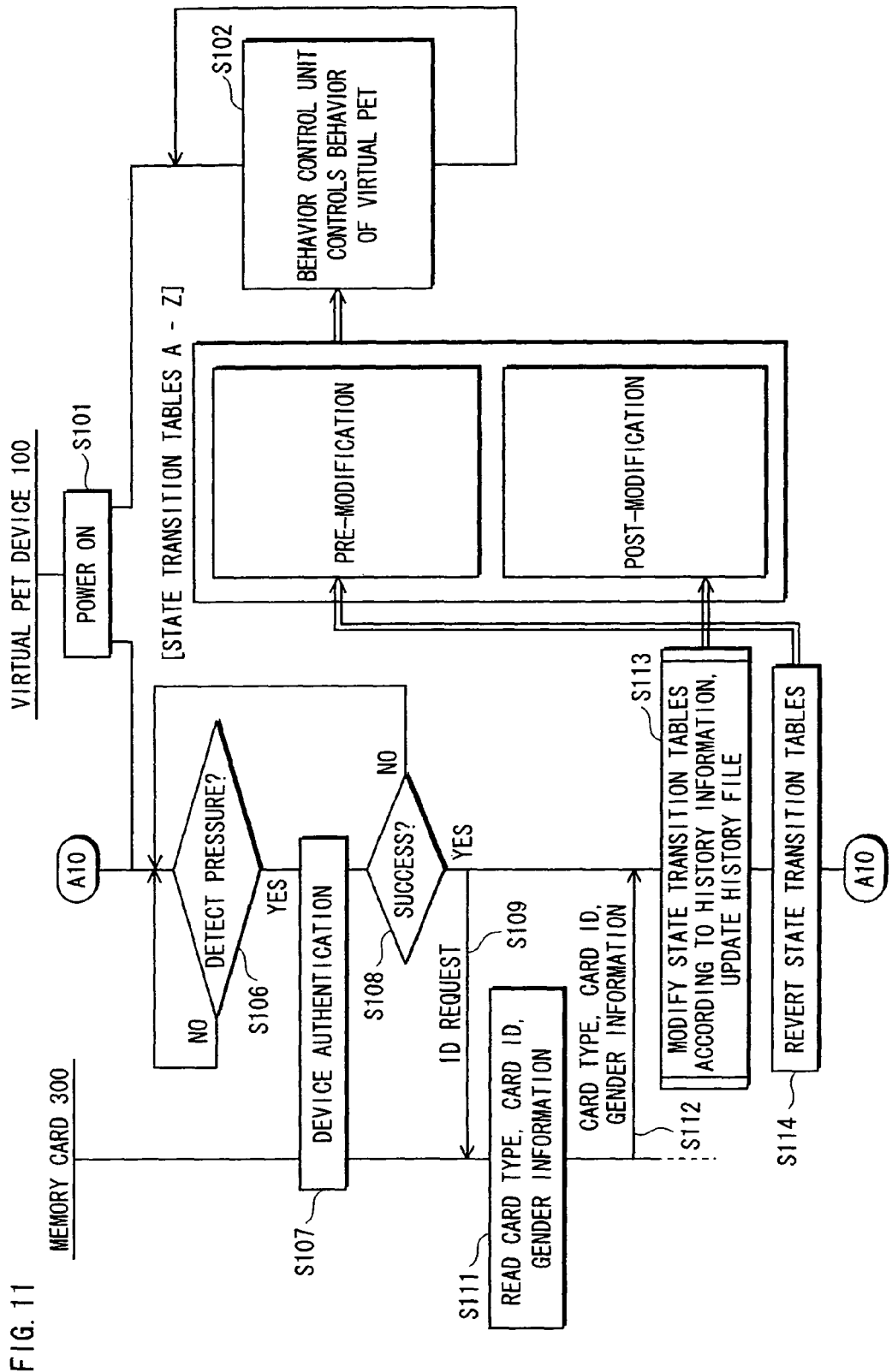
FIG. 11 is a flowchart showing operations of the virtual pet 100.

The following describes operations of the virtual pet 100 using the flowchart shown in FIG. 11.

When the power source of the virtual pet 100 is turned ON (step S101), the behavior control unit 107 continuously controls behavior of the virtual pet 100 using the state transition tables A 151 to Z 154 stored in the behavior library 108 (step S102).

Meanwhile, on receipt of pressure data from the pressure sensor 144a included in the head unit 123 (step S106:YES), the history management unit 106 instructs the authentication unit 102 to perform device authentication with the memory card 300, and the authentication unit 102 begins device authentication with the memory card 300 (step S107). If the device authentication fails (step S108:NO), processing returns to step S106, and the history management unit 106 waits until pressure data is acquired.

If the device authentication by the authentication unit 102 is successful (step S108:YES), the history management unit 106 transmits an ID request to the memory card 300 via the communication unit 101 (step S109).

The control unit 307 of the memory card 300 receives the ID request from the virtual pet 100 via the communication unit 301, reads the card type, the card ID and the gender information from the information storage unit 310 (step S111), and transmits the read card type, card ID and gender information to the virtual pet 100 via the communication unit 301 (step S112).

The history management unit 106 of the virtual pet 100 receives the card type, the card ID and the gender information from the memory card 300 via the communication unit 101. Next, the history management unit 106 modifies the transition probabilities of the state transition tables according to the history information files stored on the memory card 300 and in the virtual pet 100, and updates the history information files of both the memory card 300 and the virtual pet 100 (step S113).

When playing with the user in possession of the memory card 300 has ended, and updating of the history information is complete, the history management unit 106 returns the state transition tables to their initial states (step S114), and processing returns to step S106. However, step S114 is omitted if there is no modification to the state transition tables in step S113.

(2) Modification of State Transition Tables and Updating of History Information by the History Management Unit 106a of the Virtual Pet 100a

Figure 12:
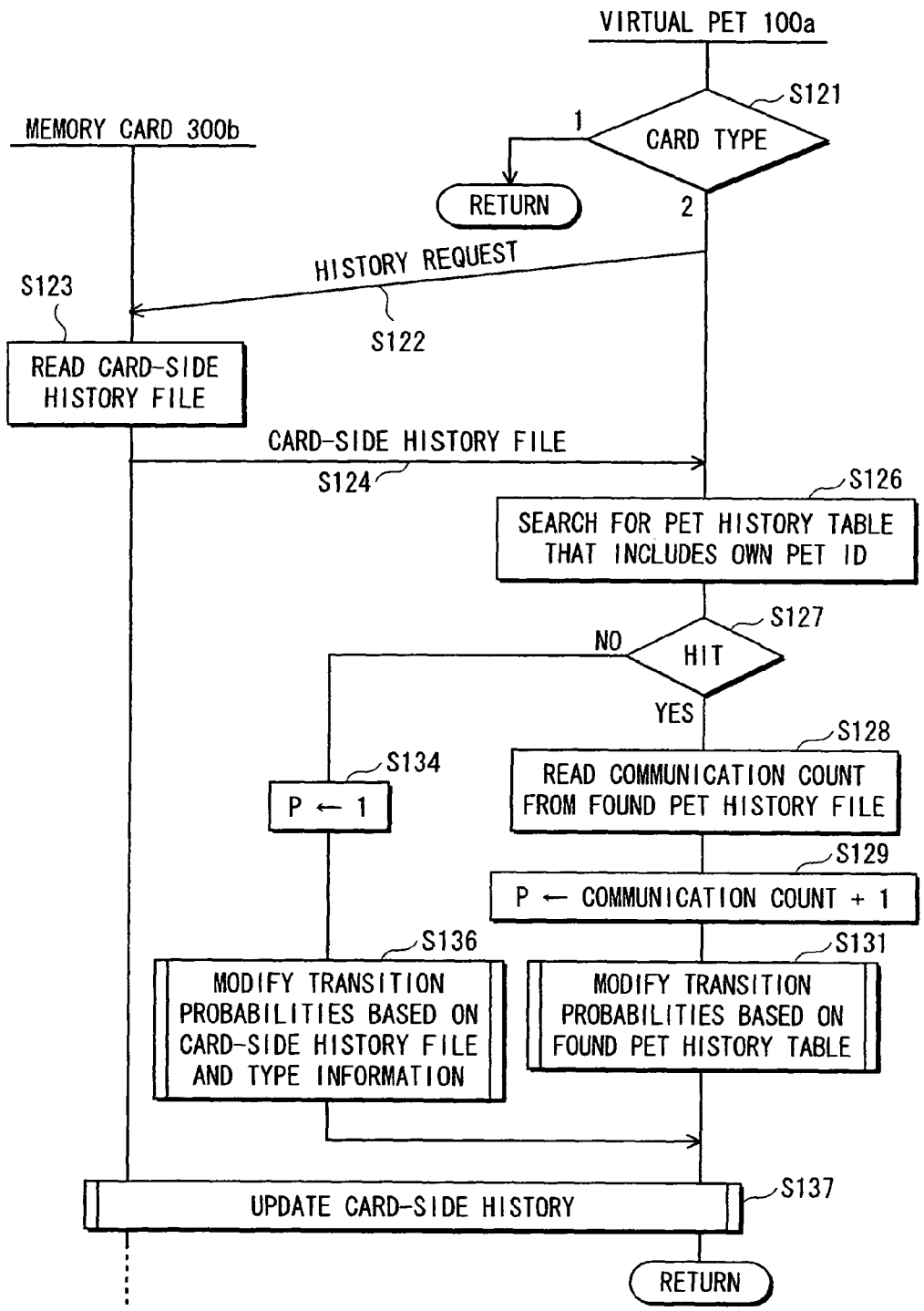

FIG. 12 is a flowchart showing operations performed by a history management unit 106a included in the virtual pet 100a regarding modifying state transition tables and updating history files. The following describes modification of state transition tables and updating of history information on the memory card 300b by the history management unit 106a, using FIG. 12. Note that this description details step S113 in FIG. 11, in the case of the virtual pet 100a.

If the card type received from the memory card 300 is "1" (step S121:"1"), the history management unit 106a of the virtual pet 100a ends processing without doing anything If the received card type is "2" (step S121:"2"), the history management unit 106a transmits a history request to the memory card 300b via the communication unit 101 (step S122).

The control unit 307b of the memory card 300b receives the history request via the communication unit 301b, and reads the card-side history file 314b from the information storage unit 310b (step S123). The control unit 307b then transmits the card-side history file 314b to the virtual pet 100 via the communication unit 301b (step S124).

The history management unit 106a of the virtual pet 100a receives the card-side history file from the memory card 300b via the communication unit 101. When the card-side history file is received, the history management unit 106a searches the card-side history file for a pet history table that includes the pet ID 116 of the virtual pet 100a stored in the unique information storage unit 104 (step S126). If the pet history table is found (step S127:YES), the history management unit 106a reads the communication count from the pet history table (step S128), and assigns the variable p a value of the communication count plus 1 (step S129). The history management unit 106a then modifies the transition probabilities of the state transition tables based on the pet history table that was found (step S131).

If a pet history table with the pet ID 116 is not found in the search of step S126 (step S127:NO), the history management unit 106a assigns the variable p a value of "1" (step S134). Next, the history management unit 106a modifies the transition probabilities of the state transition tables based on the received card-side history file and the type information "dog" of the virtual pet 100a (step S136).

Next, the history management unit 106a and the control unit 307b of the memory card 300b update the card-side history information stored on the memory card 300b (step S137).

Figure 13:
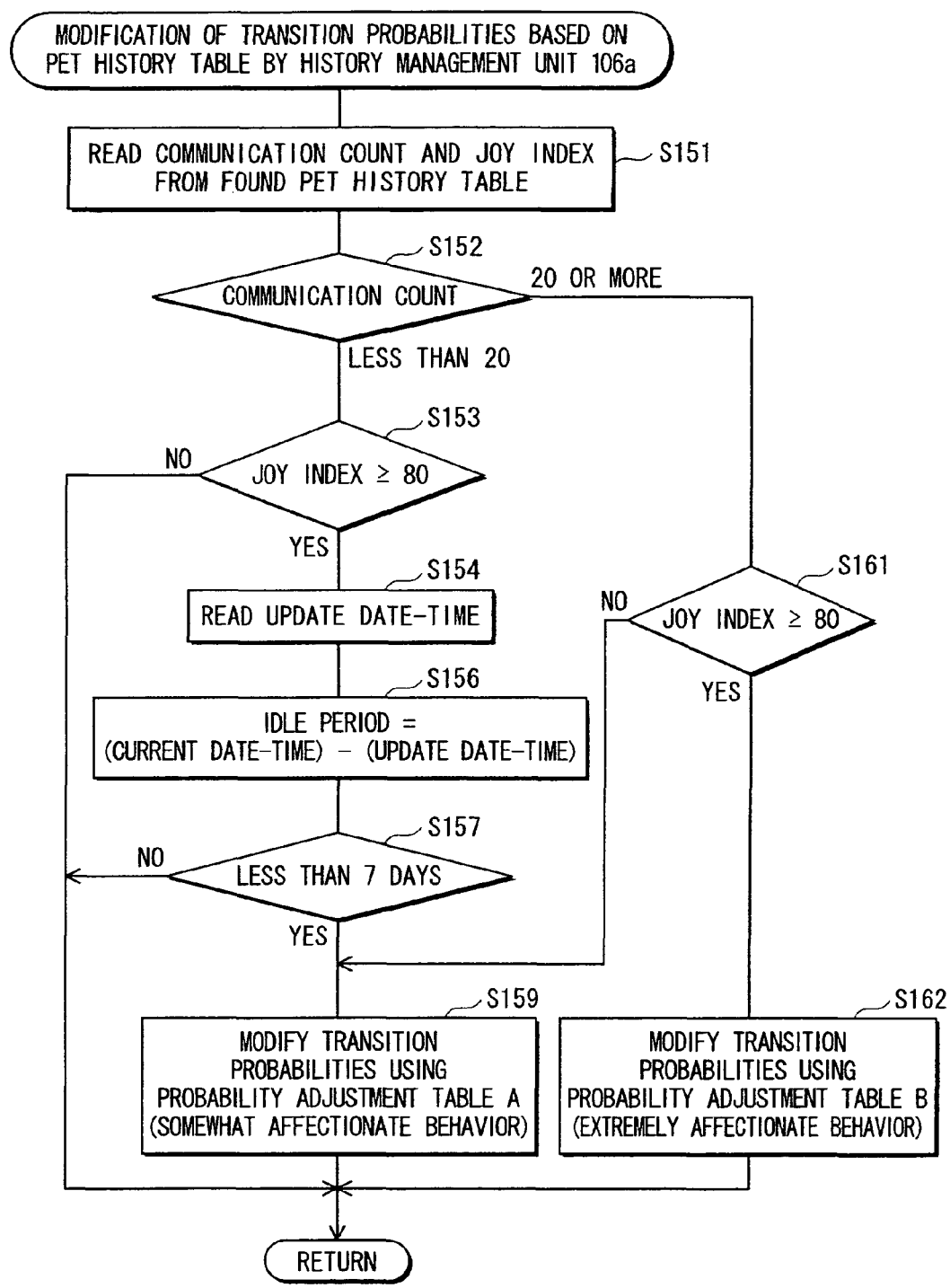
FIG. 13 is a flowchart showing operations performed by the history management unit 106a regarding modifying transition probabilities based on a pet history table, being details of step S131 in FIG. 12.

(3) Modification of Transition Probabilities by the History Management Unit 106a Based on a Pet History Table FIG. 13 is a flowchart showing operations performed by the history management unit 106a included in the virtual pet 100a regarding modifying transition probabilities based on a pet history table, being details of step S131 in FIG. 12. The following describes operations of modifying the transition probabilities based on a pet history table, using FIG. 13.

The history management unit 106a of the virtual pet 100a reads the communication count and the joy index from the pet history table that was found (step S151). If the read communication count is less than the count threshold of "20" (step S152:less than 20), the history management unit 106a compares the read joy index and the joy threshold of "80" (step S152). If the joy index is less than "80" (step S153:NO), the transition probabilities are not modified. If the joy index is "80" or more (step S153:YES), the history management unit 106a reads the update date-time from the pet history table (step S154). Next, the history management unit 106a subtracts the update date-time from the current date-time to calculate the idle period (step S156). If the calculated idle period is less than 7 days (step S157:YES), the history management unit 106a modifies the transition probabilities of the state transition tables A 151 to Z 154 using the probability adjustment table A 161 (step S159).

If the idle period is 7 days or more (step S157:NO), the history management unit 106 does not modify the transition probabilities.

If the communication count is "20" or more (step S152: "20" or more), the history management unit 106a compares the read joy index and the joy threshold of "80" (step S161), and processing moves to step S159 if the joy index is less than "80" (step S161:NO). If the joy index is "80" or more (step S161:YES), the history management unit 106a modifies the transition probabilities of the state transition tables A 151 to Z 154 using the probability adjustment table B 162 (step S162).

Figure 14:
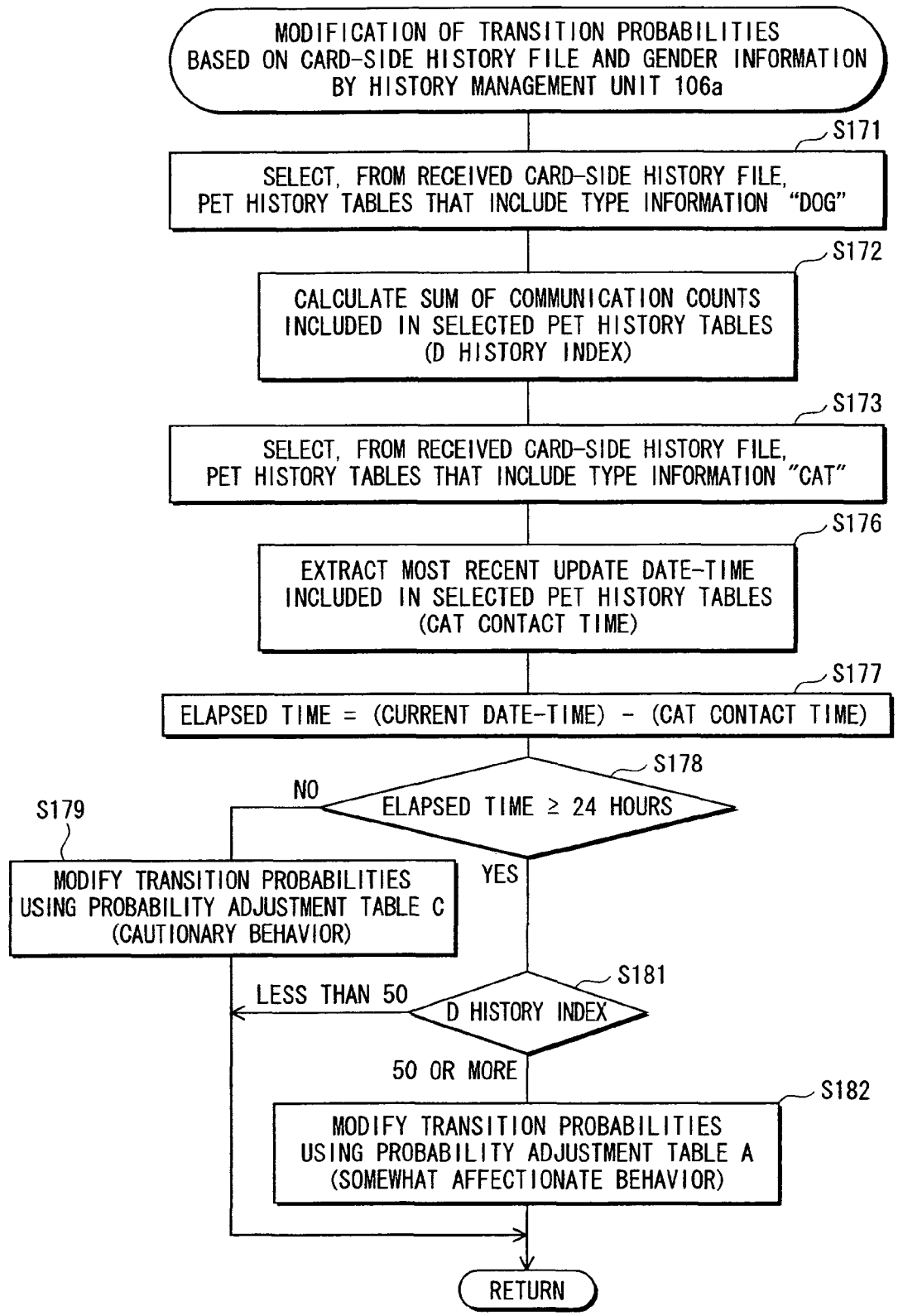
FIG. 14 is a flowchart showing operations performed by the history management unit 106a regarding modifying transition probabilities based on a card-side history file and type information, being details of step S136 in FIG. 12.

(4) Modification of Transition Probabilities by the History Management Unit 106a Based on a Card-Side History File and Type Information FIG. 14 is a flowchart showing operations performed by the history management unit 106a included in the virtual pet 100a regarding modifying transition probabilities based on a card-side history file and type information, being details of step S136 in FIG. 12. The following describes modification of transition probabilities based on a card-side history file and type information "dog", using FIG. 14.

The history management unit 106a selects, from the received card-side history file, pet history tables that include the same type information as the type information "dog" of the virtual pet 100a stored in the unique information storage unit 104 (step S171). The history management unit 106a then adds all the communication counts included in the selected pet history tables to calculate the D history index (step S172).

Next, the history management unit 106a selects, from the received card-side history file, pet history tables that include the type information "cat" (step S173), extracts the most recent update date-time included in the selected pet history tables, and makes this the cat contact time (step S176). The history management unit 106a then acquires the current time from the time measuring unit 114, and subtracts the cat contact time from the acquired current time to calculate the elapsed time (step S177). If the calculated elapsed time is less than the cat contact threshold of "24 hours" (step S178:NO), the history management unit 106a modifies the transition probabilities of the state transition tables A to Z using the probability adjustment table C 163 (step S179).

If the elapsed time is greater than or equal to the cat contact threshold of "24 hours" (step S178:YES), the history management unit 106a compares the calculated D history index and the type information threshold of "50" (step S181), and does not modify the transition probabilities if the D history index is less than "50" (step S181:less than 50).

If the D history index is "50" or more (step S181:50 or more), the history management unit 106a modifies the transition probabilities of the state transition tables using the probability adjustment table A 161 (step S182).

(5) Updating of a Card-Side History File

Figure 15:
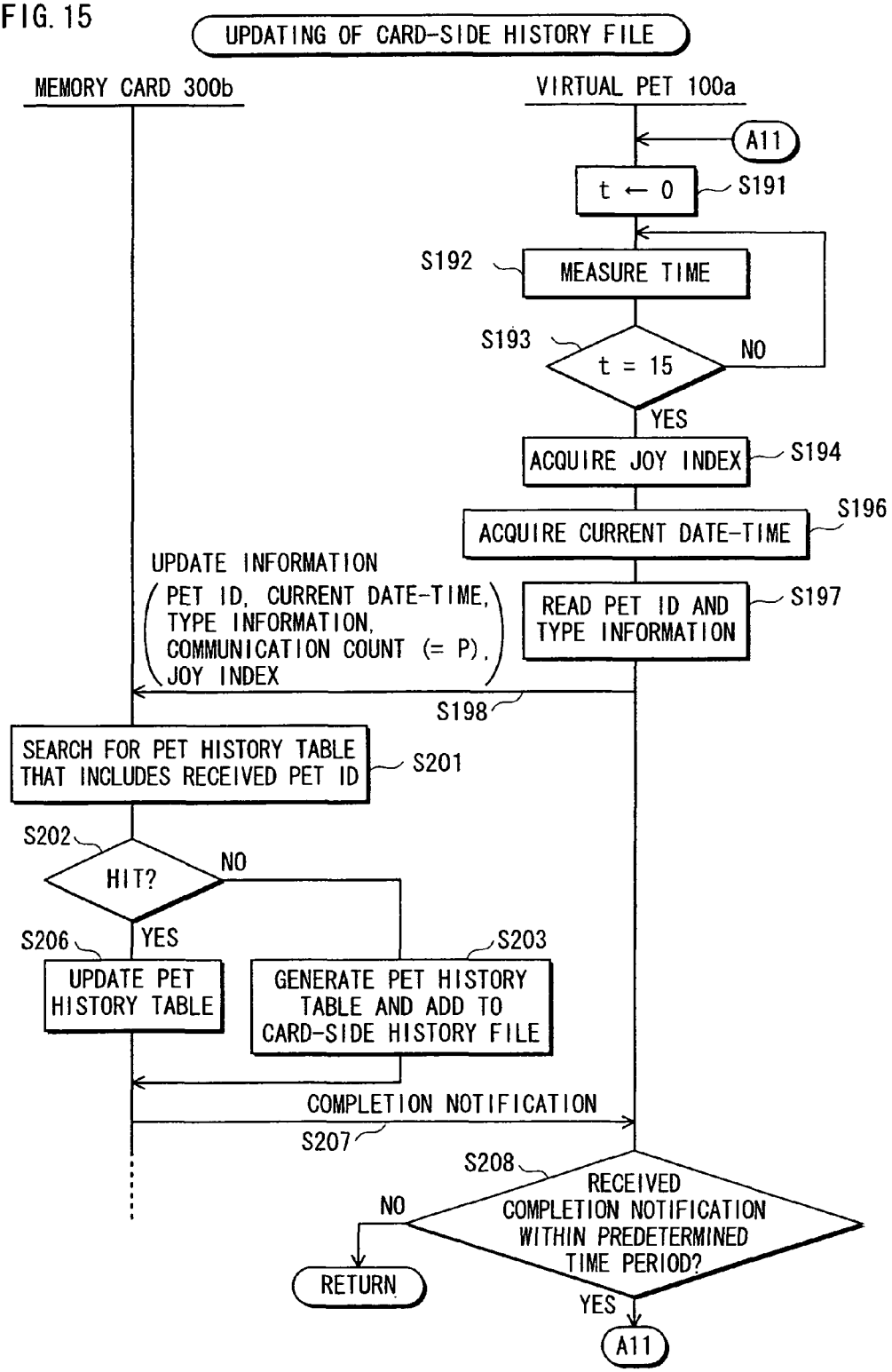
FIG. 15 is a flowchart showing update operations performed by the history management unit 106a regarding modifying a card-side history file, being details of step S137 in FIG. 12.

The following describes operations performed by the memory card 300b and the virtual pet 100a regarding updating of a card-side history file, using the flowchart shown in FIG. 15. This figure details step S137 in FIG. 12.

The history management unit 106a of the virtual pet 100a initializes the counter t to "0" (step S191), and begins measuring time (step S192). When the counter t reaches the transmission interval of "15 seconds" (step S193:YES), the history management unit 106a acquires the joy index from the emotion management unit 113 (step S194), and acquires the current date-time from the time measuring unit 114 (step S196). Next, the history management unit 106a reads the pet ID 116 and the type information 117 from the unique information storage unit 104 (step S197). The history management unit 106a then transmits update information constituted from the pet ID 116, the type information 117, the current date-time, the communication count (=variable p) and the joy index to the memory card 300b via the communication unit 101 (step S198).

The control unit 307b of the memory card 300b receives the update information from the virtual pet 100a via the communication unit 301b. The control unit 307b searches the card-side history file 314b stored in the information storage unit 310b for a pet history table with the same pet ID as the pet ID included in the received update information (step S201). If such a pet history table is not found (step S202:NO), the control unit 307b generates a new pet history table based on the received update information, and adds the generated pet history table to the card-side history file 314b (step S203).

If such a pet history table is found (step S202:YES), the control unit 307b updates the communication count, the update date-time and the joy index of the pet history table with the communication count, current date-time and joy index included in the received update information (step S206). Next, the control unit 307b transmits a completion notification, which shows that the update information was received normally, to the virtual pet 100a via the communication unit 301b (step S207).

The history management unit 106a of the virtual pet 100a measures elapsed time since transmission of the update information, and, if the completion notification is received from the memory card 300b within a predetermined time period (step S208:YES), returns to step S191 and repeats processing of steps S191 to S208.

If the completion notification is not received within the predetermined time period (step S208:NO), the history management unit 106a judges that the user in possession of the memory card 300b has finished playing with the virtual pet 100b, and ends update processing of the card-side history file.

Figure 16:
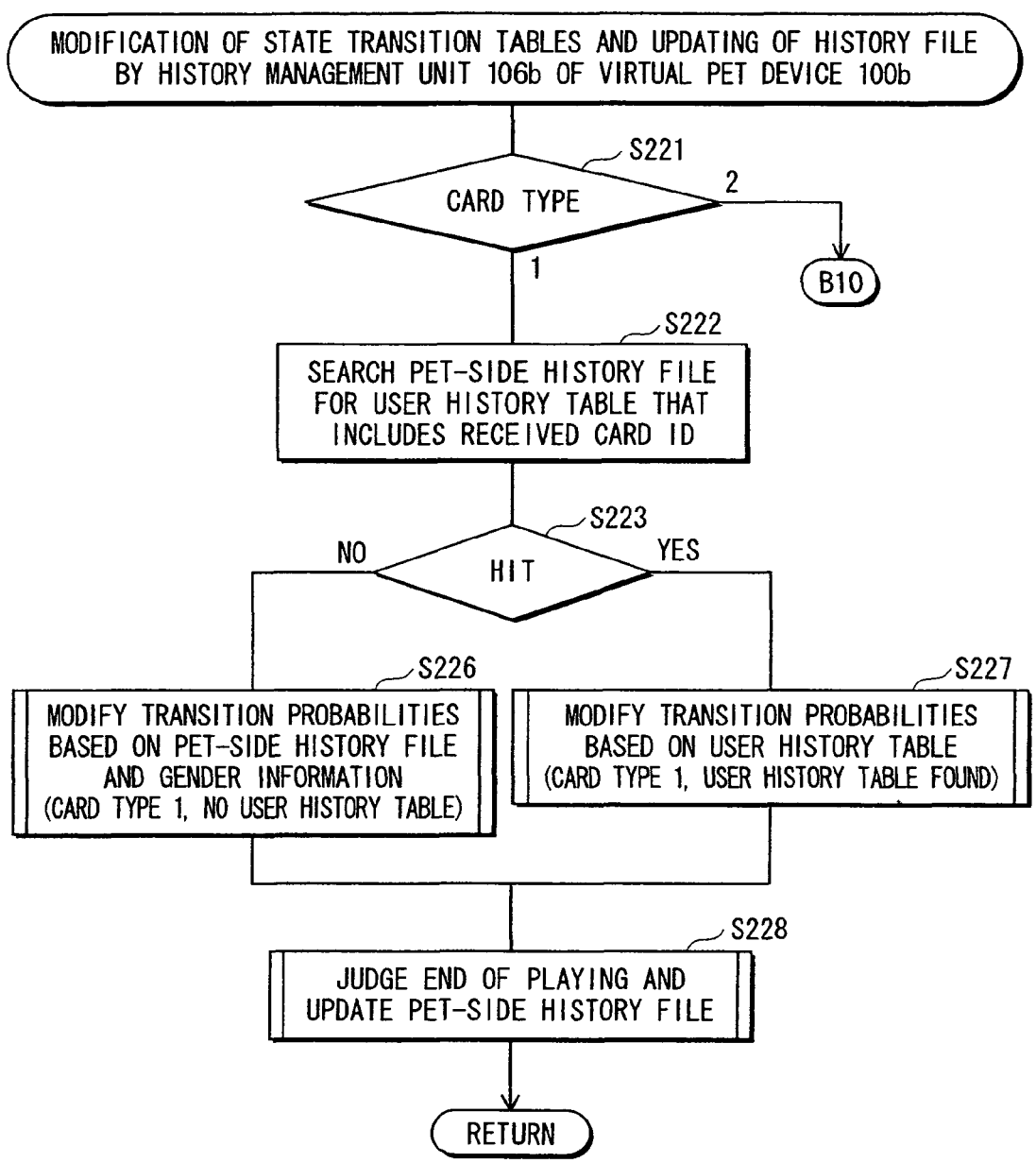
FIG. 16 is a flowchart showing operations performed by a history management unit 106a of a virtual pet 100b regarding modifying a state transition table and updating a history file, being details of step S113 in FIG. 11 in a case of the virtual pet 100b.
Figure 17:
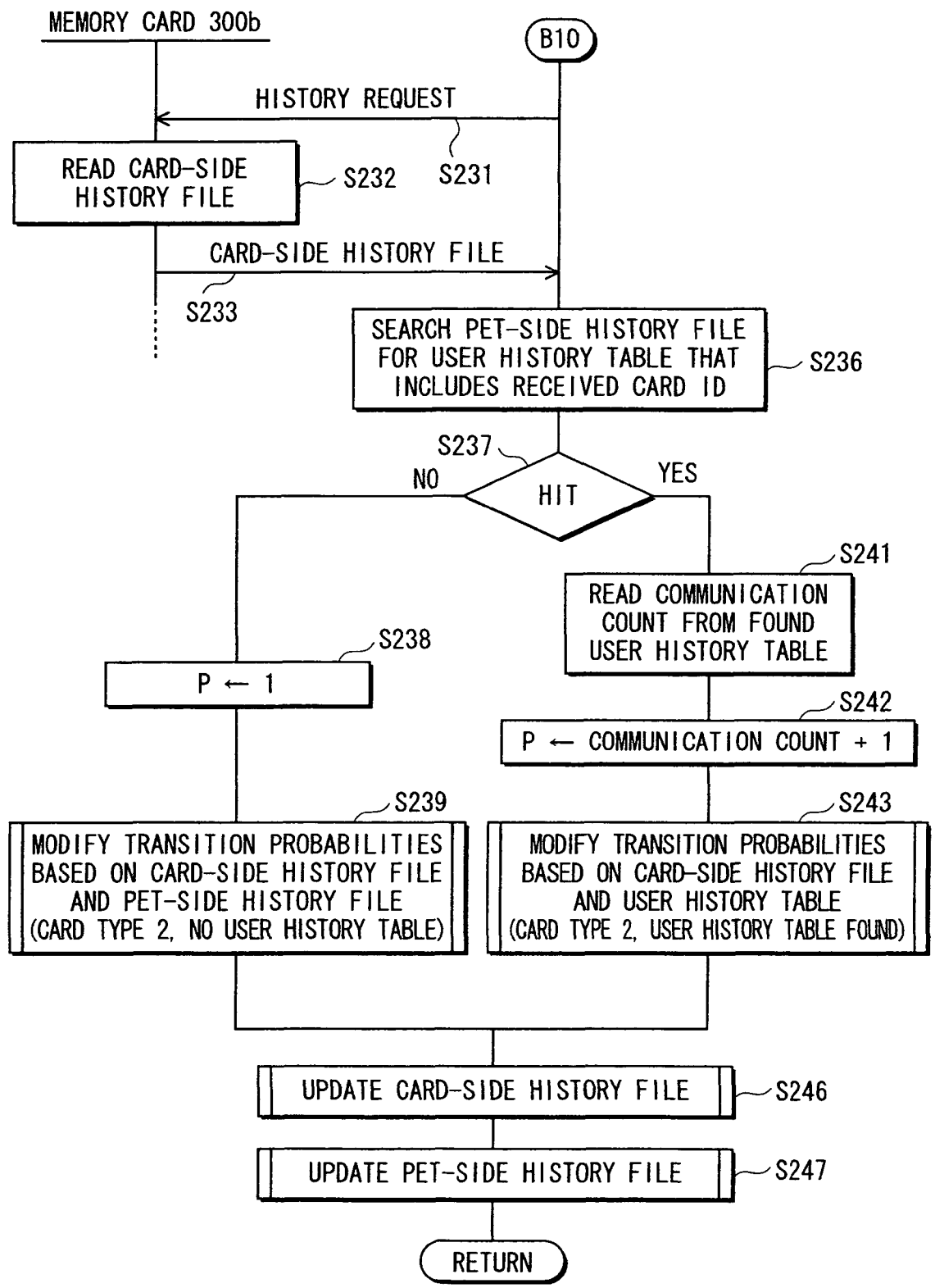
FIG. 17 is a flowchart showing operations performed by the history management unit 106a of the virtual pet 100b regarding modifying a state transition table and updating a history file, continuing from FIG. 16.

(6) Modification of a State Transition Table and Updating of History Files by the History Management Unit 106b of the Virtual Pet 100b FIGS. 16 and 17 are flowcharts showing operations performed by the history management unit 106a included in the virtual pet 100b regarding modifying a state transition table and updating a history file, being details of step S113 in FIG. 11 in a case of the virtual pet 100b. These figures detail step S113 in FIG. 11, in the case of the virtual pet 100b.

The following describes modification of a state transition table and updating of history files by the history management unit 106, using FIGS. 16 and 17.

If the card type received from the memory card 300 is "1" (step S221:"1"), the history management unit 106b of the virtual pet 100b searches the pet-side history file 119 stored in the information storage unit 110 for a user history table that includes the received card ID (step S222). If such a user history table is not found (step S223:NO), the history management unit 106b modifies the transition probabilities of the state transition tables based on the pet-side history file 119 stored by the virtual pet 100b and the received gender information (step S226).

If such a user history table is found (step S223:YES), the history management unit 106b modifies the transition probabilities of the state transition tables based on the user history table that was found (step S227). Note that a description of operations of step S227 is omitted since they are substantially the same as the modification of transition probabilities by the history management unit 106a based on the pet history table, which was described using FIG. 13. The virtual pet 100a, the history management unit 106a and the pet history table need only be replaced with the virtual pet 100b, the history management unit 106b and the user history table.

Next, the history management unit 106b judges whether the user in possession of the memory card 300a has finished playing with the virtual pet 100b, and updates the pet-side history file 119 when the judgment is affirmative (step S228).

If the received card type is "2" (step S221:"2"), the history management unit 106b transmits a history request to the memory card 300b via the communication unit 101 (step S231).

The control unit 307b of the memory card 300b receives the history request via the communication unit 301b, and reads the card-side history file 314b from the information storage unit 310b (step S232). Next, the control unit 307b transmits the card-side history file 314b to the virtual pet 100b via the communication unit 301b (step S233).

The history management unit 106b of the virtual pet 100b receives the card-side history file via the communication unit 101. Upon receiving the card-side history file, the history management unit 106b searches the pet-side history file 119 stored in the information storage unit 110 for a user history table that includes the received card ID (step S236).

If such a user history table is not found (step S237:NO), the history management unit 106b assigns the variable p a value of "1" (step S238), and then modifies the transition probabilities of the state transition tables based on the received card-side history file and the pet-side history file stored in the information storage unit 110 (step S239).

If such a user history table is found (step S237:YES), the history management unit 106b reads the communication count from the user history table (step S241), and assigns the variable p a value of the communication count plus 1 (step S242).

Next, the history management unit 106b modifies the transition probabilities of the state transition tables based on the received card-side history file and the user history table that was found (step S243).

Upon finishing modification of the transition probabilities, the history management unit 106b periodically updates the card-side history file (step S246), and updates the pet-side history file (step S247). Note that a description of details of step S246 is omitted since they are substantially the same as operations of modifying the card-side history file that were described in FIG. 15. The virtual pet 100a and the history management unit 106a in FIG. 15 need only be replaced with the virtual pet 100b and the history management unit 106b.

Also, a description of details of step S247 is omitted since they are the same as steps S276 to S287 of FIG. 19 (mentioned in detail later), which are operations of end judgment and updating of a pet-side history file in the case of card type "1".

(7) Modification of Transition Probabilities Based on a Pet History File and Gender Information by the History Management Unit 106b

Figure 18:
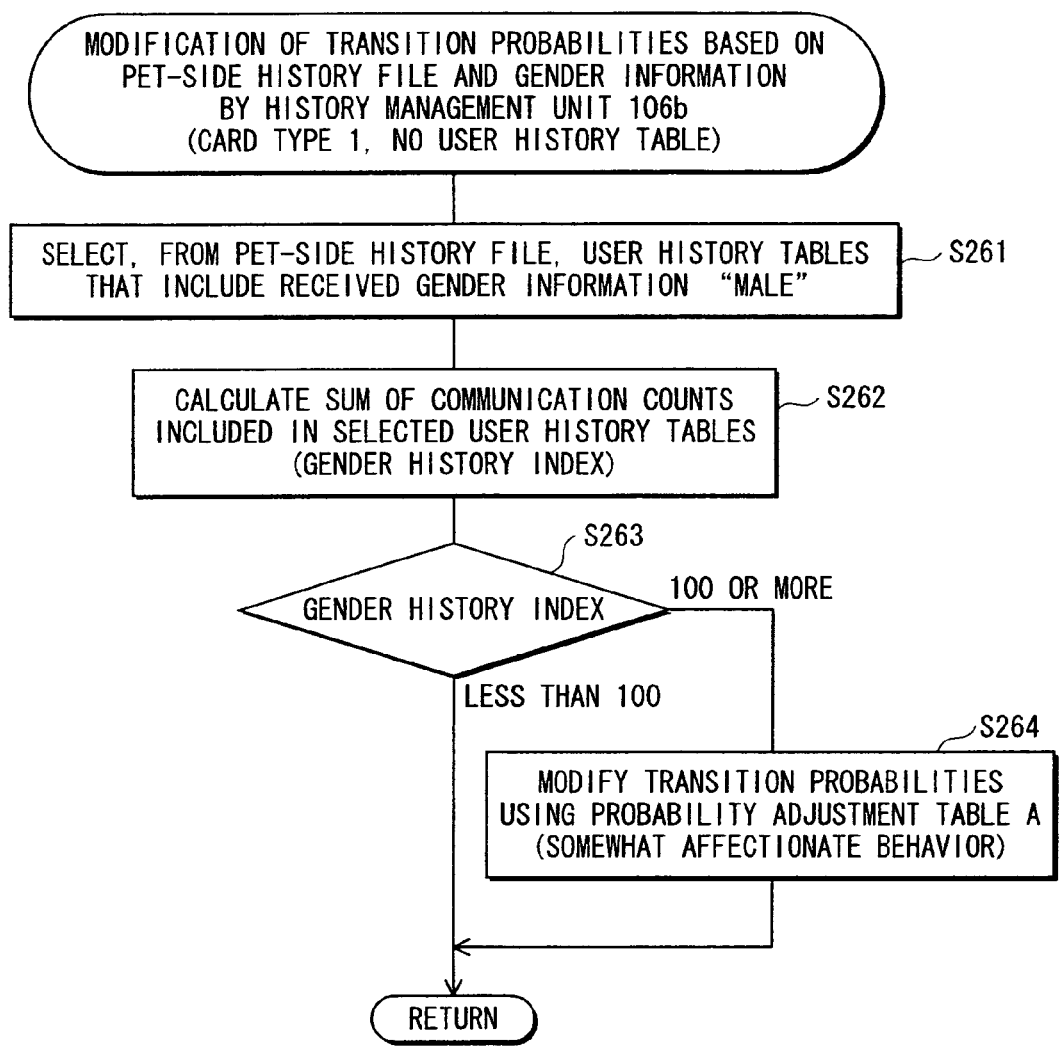
FIG. 18 is a flowchart showing operations performed by the history management unit 106b regarding modifying transition probabilities based on a pet-side history file and gender information, being details of step S226 in FIG. 16.

FIG. 18 is a flowchart showing operations performed by the history management unit 106b regarding modifying transition probabilities based on a pet-side history file and gender information, being details of step S226 in FIG. 16. The following describes operations of modifying transition probabilities based on a pet-side history file and gender information, using the flowchart shown in FIG. 18.

The history management unit 106b of the virtual pet 100b selects, from the pet-side history file 119 stored in the information storage unit 110, user history tables that include the received gender information "male" (step S261). Next, the history management unit 106b adds all the communication counts included in the selected user history tables to calculate the gender history index (step S262).

If the calculated gender history index is greater than or equal to the gender history threshold of "100" (step S263:100 or more), the history management unit 106b reads the probability adjustment table A from the behavior library 108, and modifies the transition probabilities of the state transition tables A to Z using the probability adjustment table A (step S264).

If the calculated gender history index is less than "100" (step S263:less than 100), the transition probabilities are not modified.

(8) End Judgment and Updating of a Pet-Side History File in the Case of Card Type "1"

Figure 19:
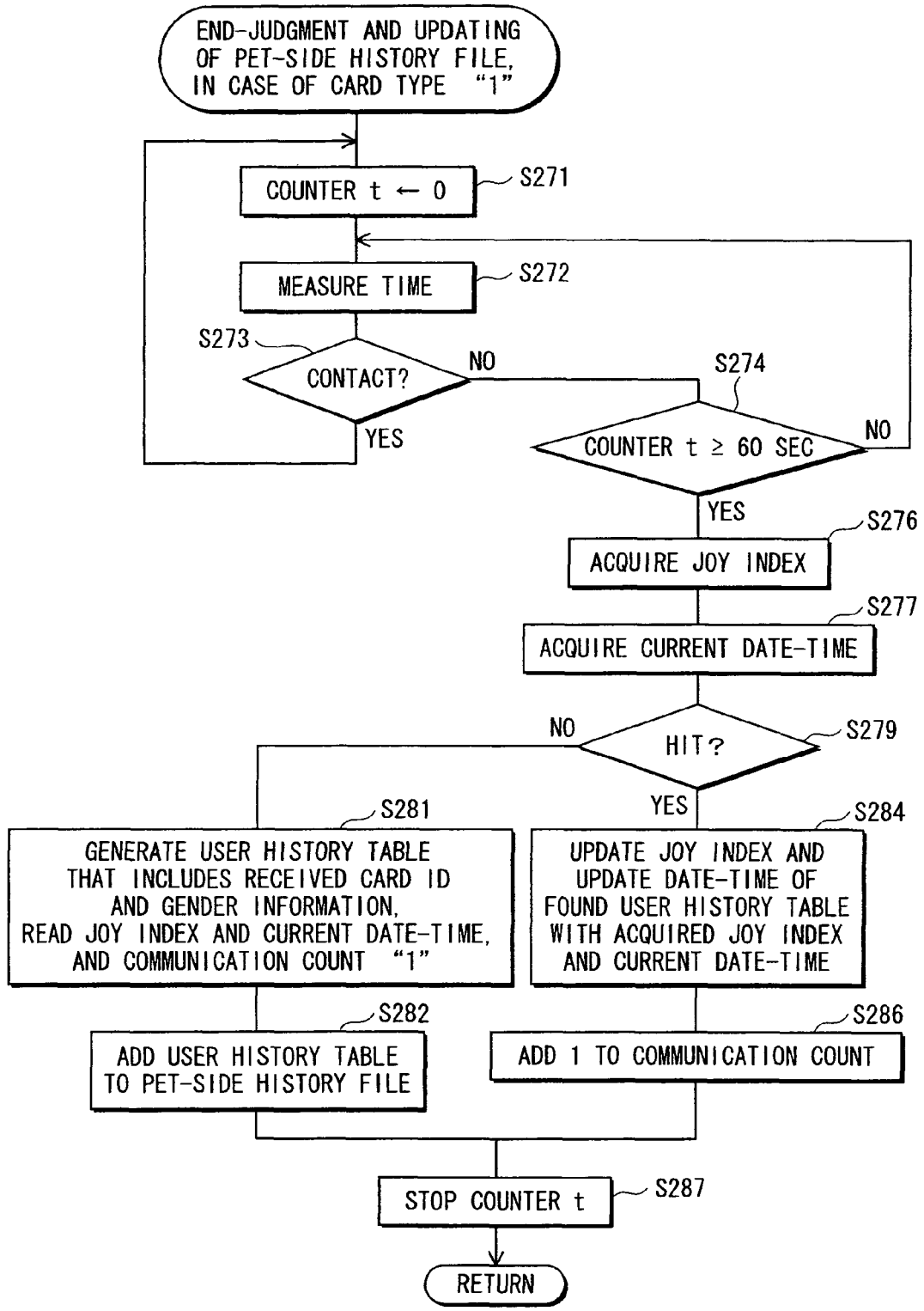
FIG. 19 is a flowchart showing operations performed by the history management unit 106b regarding end judgment in a case of a card type "1", and updating a pet-side history file, being details of step S228 in FIG. 16.

FIG. 19 shows, in the case of the user in possession of the memory card 300a with the card type "1" playing with the virtual pet 100b, operations of judging an end of playing and updating of the pet-side history file 119 when playing has ended. The following describes operations of end judgment and updating of pet-side history information by the history management unit 106b of the virtual pet 100b, using the flowchart of FIG. 19. Note that this figure details step S228 in FIG. 16.

The history management unit 106b initializes the counter t to "0" (step S271), and begins measuring time (step S272). Here, processing returns to step S271 when the pressure sensor 144a included in the head unit 123 detects contact to the head unit 123 from the user (step S273:YES).

Here, if contact to the head unit 123 from the user is not detected, the history management unit 106b compares the counter t and the contact interval of "60 seconds", and returns to step S272 and continues measuring time if the counter t is less than "60 seconds" (step S274:NO).

If the counter t is "60 seconds" or more, the history management unit 106b acquires the joy index from the emotion management unit 113 (step S276), and acquires the current date-time from the time measuring unit 114 (step S277).

If a user history table that includes the received card ID is found (step S279:YES), the history management unit 106b updates the update date-time and joy index of the user history table with the current date-time and the acquired joy index (step S284). The history management unit 106b then adds 1 to the communication count of the user history table (step S286).

If a user history table that includes the received card ID is not found, the history management unit 106b generates a new user history table (step S281). Here, the newly generated user history table includes the received card ID and gender information, the acquired joy index and current date-time (update date-time), and a communication count of "1". Next, the history management unit 106b adds the generated user history table to the pet-side history file in the information storage unit 110 (step S282).

Next, the history management unit 106b stops the counter t (step S287).

Figure 20:
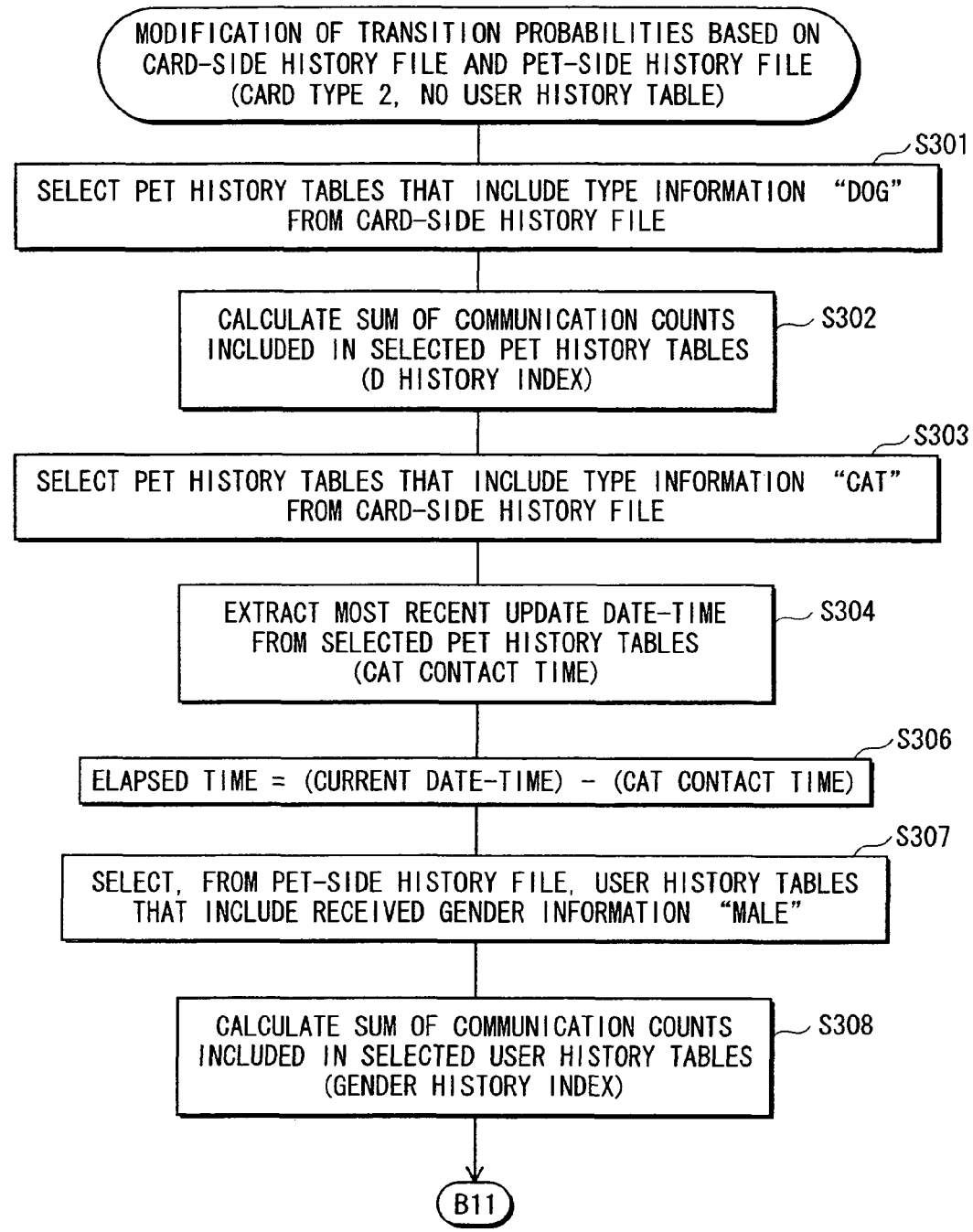
FIG. 20 is a flowchart showing operations performed by the history management unit 106b regarding modifying transition probabilities based on a card-side history file and a pet-side history file, being details of step S239 in FIG. 17.
Figure 21:
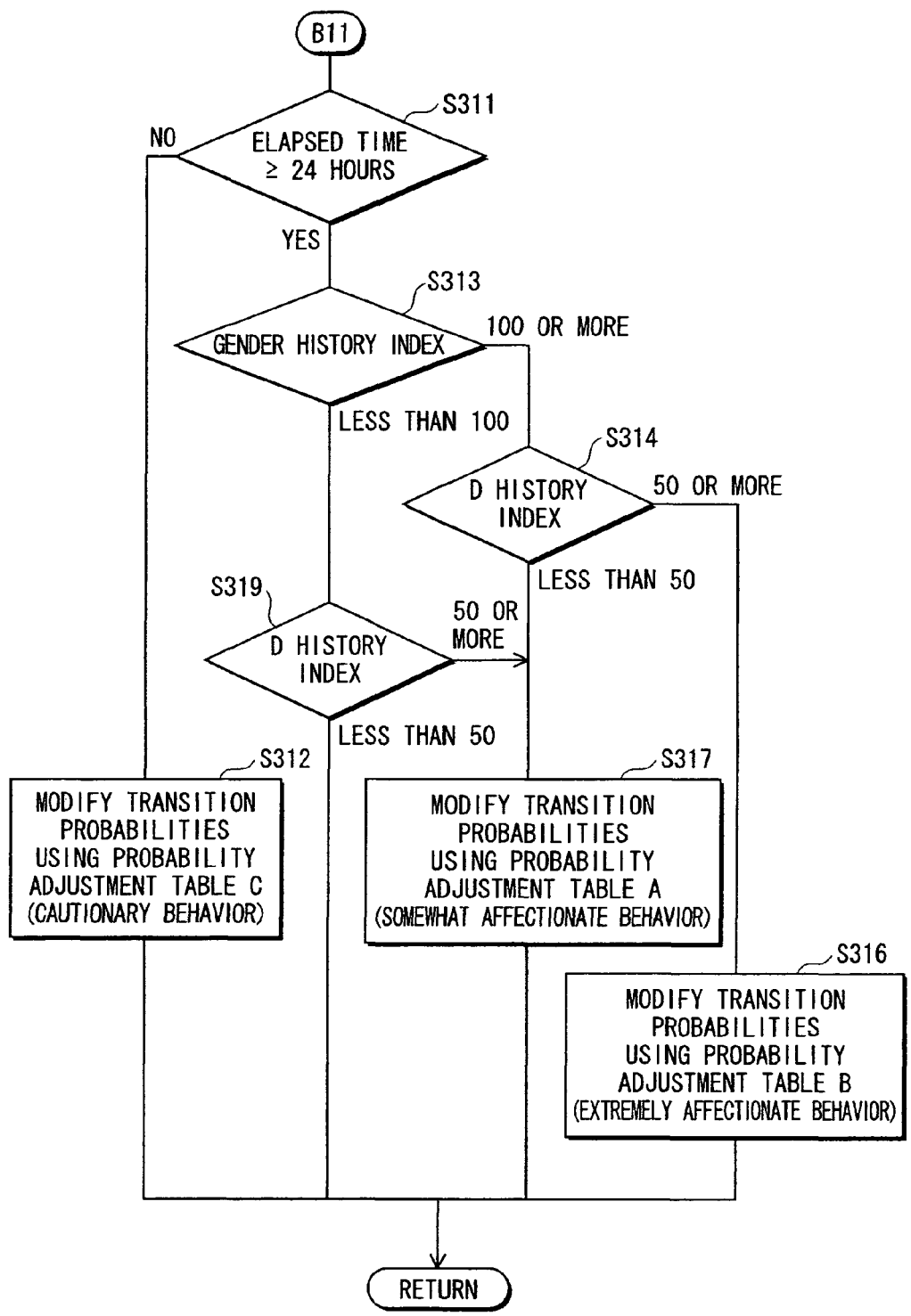
FIG. 21 is a flowchart showing operations performed by the history management unit 106b regarding modifying transition probabilities based on a card-side history file and a pet-side history file, continuing from FIG. 20.

(9) Modification of Transition Probabilities Based on Card-Side History Information and Pet-Side History Information FIGS. 20 and 21 show a process of updating transition probabilities of the state transition tables based on a card-side history file and a pet-side history file if a user history table that includes the card ID received from the memory card 300b is not found in the pet-side history file 119 stored by the virtual pet 100b. The following describes operations of modifying transition probabilities based on a card-side history file and a pet-side history file by the history management unit 106b of the virtual pet 100b, using FIGS. 20 and 21. Note that this details step S239 in FIG. 17.

The history management unit 106b selects, from the received card-side history file, pet history tables stored by the virtual pet 100b that include the type information "dog" (step S301). The history management unit 106b then adds all the communication counts included in the selected pet history tables to calculate the D history index (step S302).

The history management unit 106b then selects pet history tables that include the type information "cat" from the received card-side history file (step S303). The history management unit 106b extracts the most recent update date-time included in the selected pet history tables. This is made the cat contact time (step S304). Next, the history management unit 106b acquires the current date-time from the time measuring unit 114, and subtracts the cat contact time from the acquired current date-time to calculate the elapsed time (step S306).

The history management unit 106b then selects, from the pet-side history file 119 stored in the information storage unit 110, user history tables that include the received gender information "male" (step S307). The history management unit 106b adds all the communication counts included in the selected user history tables to calculate the gender history index (step S308).

If the calculated elapsed time is less than the cat contact threshold of "24 hours" (step S311:NO), the history management unit 106b modifies the transition probabilities of the state transition tables A 151 to Z 154 using the probability adjustment table C 163 (step S312).

If the elapsed time is "24 hours" or more (step S311:YES), the history management unit 106b compares the calculated gender history index and the gender history threshold of "100". If the gender history index is "100" or more, the history management unit 106b further compares the calculated D history index and the type history threshold of "50". If the calculated D history index is "50" or more (step S314: 50 or more), the history management unit 106b modifies the transition probabilities of the state transition tables using the probability adjustment table B 162 (step S316). If the D history index is less than "50" (step S314:less than 50), the transition probabilities of the state transition tables are modified using the probability adjustment table A 161 (step S317).

If the gender history index is less than "100" (step S313: less than 100), the history management unit 106b compares the D history index and the type information threshold of "50". If the D history index is "50" or more (step S319:50 or more), the history management unit 106b modifies the transition probabilities of the state transition tables using the probability adjustment table A 161 (step S317). If the D history index is less than "50" (step S319:less than 50), the history management unit 106b does not modify the transition probabilities.

Figure 22:
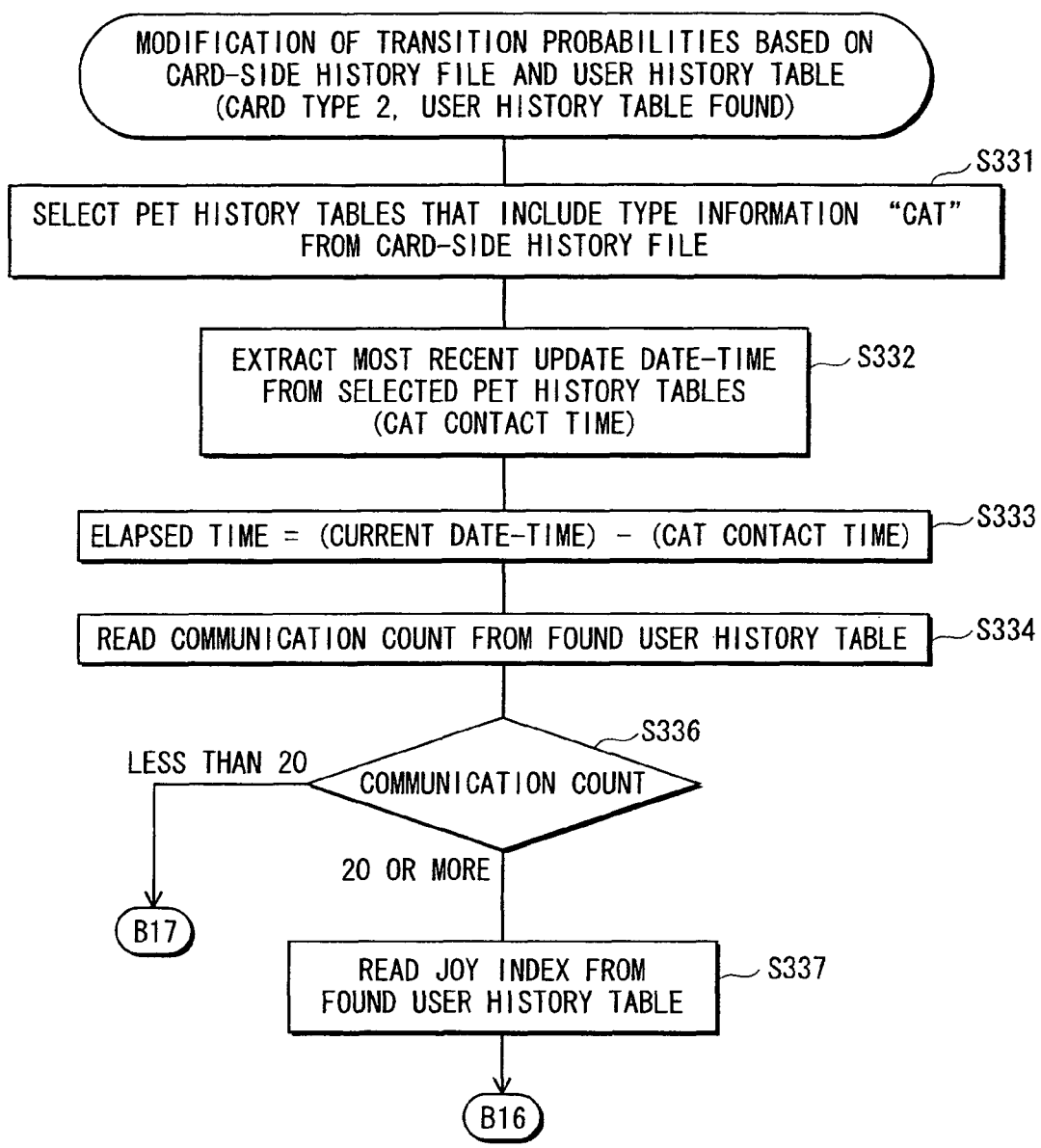
FIG. 22 is a flowchart showing operations performed by the history management unit 106b regarding modifying transition probabilities based on a card-side history file and a user history table, being details of step S243 in FIG. 17.
Figure 23:
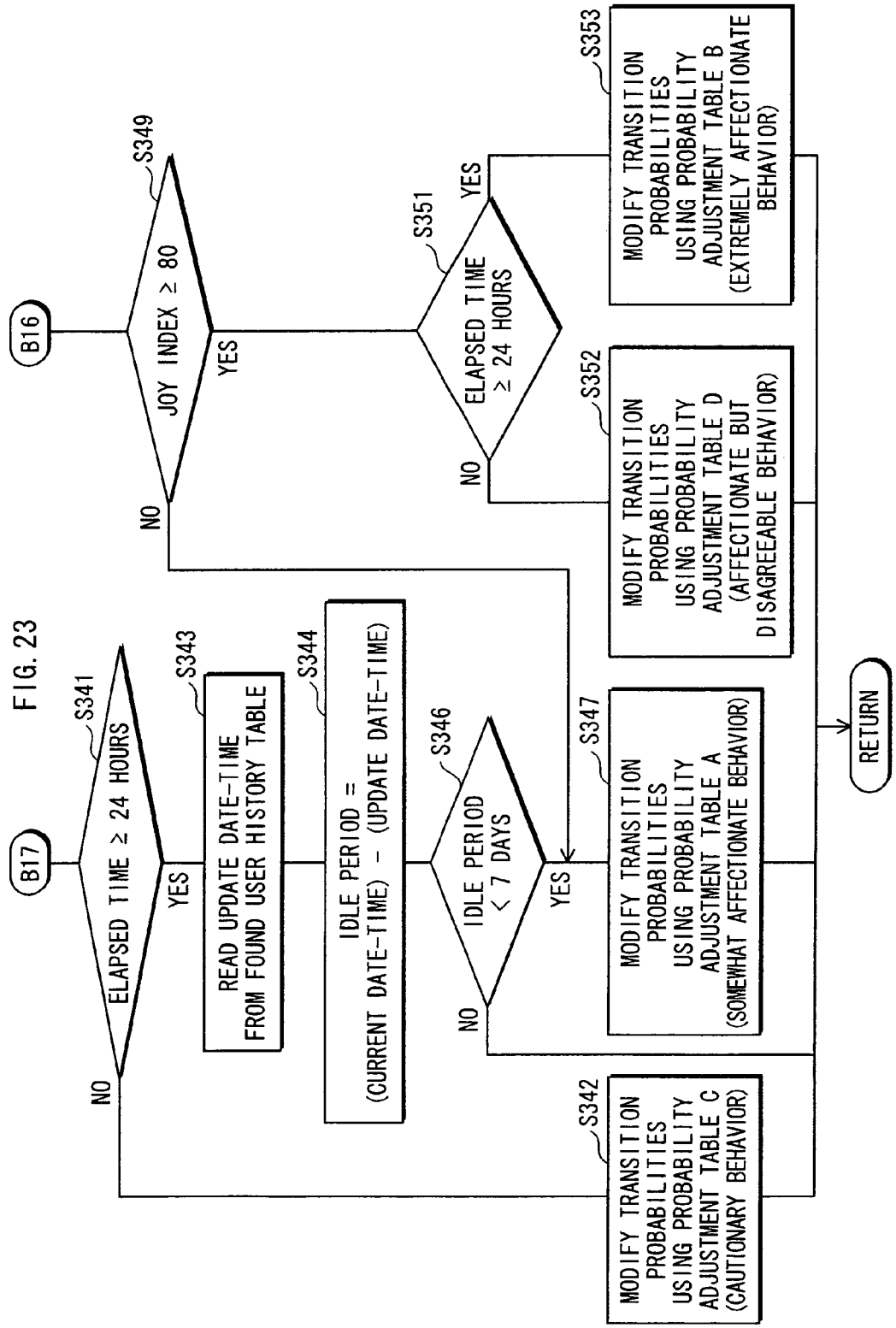
FIG. 23 is a flowchart showing operations performed by the history management unit 106b regarding modifying transition probabilities based on a card-side history file and a user history table, continuing from FIG. 22.

(10) Modification of Transition Probabilities Based on a Card-Side History File and a User History Table FIGS. 22 and 23 show processing regarding modification of transition probabilities based on a card-side history file and, if a user history table that includes the received card ID is received from the memory card 300b, based on the user history table as well. The following describes operations performed by the history management unit 106b of the virtual pet 100b regarding modifying transition probabilities based on a card-side history file and a user history table, using the flowcharts shown in FIGS. 22 and 23. Note that this details step S243 in FIG. 17.

The history management unit 106b of the virtual pet 100b selects, from the card-side history file received from the memory card 300b, pet history tables that include the type information "cat" (step S331). The history management unit 106b extracts the most recent update date-time included in the selected pet history tables. This is made the cat contact time (step S332). The history management unit 106b then acquires the current date-time from the time measuring unit 114, and subtracts the cat contact time from the current date-time to calculate the elapsed time (step S333).

Next, the history management unit 106b reads the communication count from the user history table that was found in the pet-side history file 119 and included the received card ID (step S334). The history management unit 106b compares the communication count and the count threshold of "20", and, if the communication count is less than "20" (step S336:less than 20), compares the calculated elapsed time and the cat contact threshold of "24 hours". If the elapsed time is less than "24 hours" (step S341:NO), the history management unit 106b modifies the transition probabilities of the state transition tables using the probability adjustment table C 163 (step S342).

If the elapsed time is "24 hours" or more (step S341:YES), the history management unit 106b reads the update date-time from the user history table that was found (step S343). The history management unit 106b acquires the current date-time from the time measuring unit 114, and subtracts the update date-time from the current date-time to calculate the idle period (step S344). The history management unit 106b then compares the calculated idle period and the idle period threshold of "7 days", and, if the idle period is longer than "7 days" (step S346:NO), does not modify the transition probabilities.

If the calculated idle period is within "7 days" (step S346: YES), the history management unit 106b modifies the transition probabilities using the probability adjustment table A 161 (step S347).

If the communication count that was read is "20" or more (step S336:20 or more), the history management unit 106b reads the joy index from the user history table that was found (step S337). The history management unit 106b compares the joy index and the joy threshold of "80", and, if the joy index is less than "80" (step S349:NO), processing moves to step S347.

If the joy index is "80" or more (step S349:YES), the history management unit 106b compares the calculated elapsed time and the cat contact threshold of "24 hours), and if the elapsed time is less than "24 hours" (step S351:NO), modifies the transition probabilities of the state transition tables using the probability adjustment table D 164 (step S352).

If the calculated elapsed time is "24 hours" or more (step S351:YES), the history management unit 106b modifies the transition probabilities of the state transition tables using the probability adjustment table B 162 (step S353).

1.6 Summary and Effects

As described above, the virtual pet 100 belonging to the virtual pet system 1 of the present invention references information stored on the memory card 300 to decide which kind of behavior to take when playing with the user in possession of the memory card 300.

Specifically, the virtual pet 100b can use the card ID acquired from the memory card 300 to accurately search for a user history table on the memory card 300. Compared with conventional technology, it is possible to simply and accurately select a user history table without including a high-performance imaging system or analysis system.

Also, the virtual pet 100 references not only its own history of playing with the user in possession of the memory card 300, but also histories of when the user played with other virtual pets and its own histories of playing with other users to modify behavior patterns.

As a result, if a history associated with the virtual pet 100a is not found in the card-side history file stored on the memory card 300b, the virtual pet 100a may take a cautious attitude based on a history of the owner playing with another virtual pet (e.g., the owner of the memory card 300b has just been playing with a cat-type virtual pet, which differs in type from the virtual pet 100a). This mimics the behavior of dogs which will not take to a person as long as he still has the scent of a cat. Also, the virtual pet 100a will behave affectionately even when first meeting the user if he has played with another dog-type virtual pet many times. This mimics situations where dogs easily take to a person who is used to handling dogs, even when meeting the person for the first time.

If a user history table associated with the memory card 300a is not found, the virtual pet 100b may behave affectionately toward the user with the memory card 300a, even when first meeting him, based on a user history table of playing with a user in possession of another memory card (e.g., the virtual pet 100b has played many times with a user in possession of a memory card having the same gender information "male" as is stored on the memory card 300a). This mimics situations where dogs which often come into contact with males take to males easily, and dogs which often come into contact with females take to females easily.

Furthermore, even if the pet-side history file stored by the virtual pet 100b and the card-side history file stored by the memory card 300b show that the virtual pet 100b has played with the user many times, and that it felt the user was fun, the virtual pet 100b may behave affectionately but disagreeably if the user has just played with a cat-type virtual pet. In other words, this mimics situations where even usually closely attached pet dogs will purposely take a sulking attitude and be jealous if their owner came into contact with another animal, and the animal's scent still remains on the owner.

In this way, the virtual pet 100 of the present invention can more closely mimic realistic pet behavior by using not only history information of current play between the virtual pet and the user, but also histories of contact between the user and other virtual pets, and histories of contact between the virtual pet and other users, thereby enabling the virtual pet 100 to give the user a higher sense of satisfaction and closeness.

2. Variations

Although described above based on embodiment 1, the present invention is not limited to this, and includes the following as well.

(1) Although the behavior library 108 stores four probability adjustment tables which the history management unit 106 uses to modify the transition probabilities of the state transition tables A 151 to Z 154 in embodiment 1, the behavior library 108 may instead store state transition tables Aa to Za which have been generated by modifying the transition probabilities of the state transition tables using the probability adjustment table A, state transition tables Ab to Zb which have been generated by increasing or decreasing the transition probabilities of the state transition tables using the probability adjustment table B, state transition tables Ac to Zc which have been generated by increasing or decreasing the transition probabilities of the state transition tables using the probability adjustment table C, and state transition tables Ad to Zd which have been generated by increasing or decreasing the transition probabilities of the state transition tables using the probability adjustment table D.

Instead of modifying the transition probabilities of the state transition tables A to Z using the probability adjustment table A as in embodiment 1, the history management unit 106 instructs the behavior control unit 107 to convert the state transition tables into state transition tables Aa to Za.

The history management unit 106 also instructs the behavior control unit 107 to similarly convert the state transition tables in cases of modifying the state transition tables using the probability adjustment tables B to D.

As a result of this, the need to calculate the transition probabilities of the state transition tables whenever communicating with the memory card is eliminated, and it is possible to quickly modify behavior of the virtual pet 100 so as to correspond with the user in possession of the memory card.

(2) Although the history management unit 106 of the virtual pet 100b selects a probability adjustment table based on the pet-side history file stored in the information storage unit 110 and the received gender information if a user history table associated with the card ID received from the memory card 300 is not found, any of the probability adjustment tables may be selected depending simply on the received gender information, regardless of whether or not there is a user history table associated with the received card ID.

Also, if a probability adjustment table that uniquely corresponds to the received gender information is stored in the behavior library 108, but a user history table associated with the received card ID is not found, the history management unit 106 modifies the transition probabilities using the probability adjustment table that corresponds to the gender information.

For example, if a probability adjustment table E associated with the gender information "female" and a probability adjustment table F associated with the gender information "male" are stored, and the transition probabilities are modified using the probability adjustment table E, there is an increased probability that the virtual pet 100b will perform operations such as "snuggle", "output a whining noise" and "walk slowly", while there is a decreased probability of performing intense operations such as "bark loudly" and "jump", whereby the virtual pet 100b will, as a whole, behave calmly. If the transition probabilities are modified using the probability adjustment table F, there is an increased probability of performing operations such as "run quickly" and "jump high", whereby the virtual pet 100b will, as a whole, behave energetically.

Furthermore, the card IDs and the probability adjustment tables may be stored in one to one correspondence, and a probability adjustment table may be selected using only the received card ID. In this case, the behavior library 108 associates and stores the card IDs and the probability adjustment tables. Also, corresponding card IDs may be included in headers of the state transition tables.

(3) Although the memory card 300 stores gender information which shows the gender of the user in possession of the memory card 300, the present invention is not limited to this. The memory card 300 may store attribute information about the user such as age, age group, and nationality. Information showing the user's surname and personal preferences (prefer quiet pets, prefer energetic pets) may also be included.

Furthermore, the virtual pet 100 may store probability adjustment tables corresponding to each piece of attribute information, as in variation 2.

(4) If a pet history table that includes the pet ID of the virtual pet 100a is found in the received card-side history file, the history management unit 106a of the virtual pet 100a selects a probability adjustment table using only the pet history table corresponding with its own pet ID. However, another pet history table may be used.

For example, even in the case of a user who has played with the virtual pet 100a many times and is friendly, the virtual pet 100a calculates the cat contact time similarly to the history management unit 106b of the virtual pet 100b and will be controlled to behave disagreeably if the user has just played with a different type of robot.

(5) Although the memory card 300b transmits its stored card-side history file upon receiving a history request, the memory card 300b may alternatively acquire the pet ID from the virtual pet 100 and transmit the pet history table that corresponds to the acquired pet ID.

(6) The information storage unit 110 included in the virtual pet 100b may be a removable recording medium. As a result, even if the user buys a new virtual pet due to a malfunction or the sale of a newer version, loading the memory card into the new virtual pet will cause it to behave similarly to the old virtual pet. Consequently, the user can feel a sense of attachment to the new virtual pet as well.

(7) The above embodiment 1 and variations have been described assuming only dog-type and cat-type virtual pets, where the type information "dog" virtual pets and type information "cat" virtual pets do not get along well. However, the virtual pets are not limited to these two types. There may be virtual pets which simulate other animals. Even within the same type of virtual pet, there may be various types such as dachshund-type, Chihuahua-type, American shorthair-type, and Siamese cat-type.

In this case, the virtual pets prestore type identifiers that show mutually friendly and mutually unfriendly types. In the above embodiment, the virtual pets 100a and 100b, which have the type information "dog", will behave affectionately even when meeting a new user if the new user has played at least 50 times with other virtual pets having the same type information, and will behave cautiously if less than 24 hours has passed since the new user played with a virtual pet having the different type information "cat". Alternatively, in the present variation the virtual pets will behave affectionately if the new user has played at least 50 times with virtual pets that have prestored mutually friendly type identifiers, and will behave cautiously if less than 24 hours has passed since the new user played with a virtual pet that has a mutually unfriendly type identifier.

(8) A series number and a version number may be stored in addition to the type information. The series number identifies the manufacturer of the virtual pet and under which concept it was manufactured, while the version number shows the development period and generation of the virtual pet. In this case, the virtual pet will behave affectionately even with a new user if he has played with a virtual pet that has the same series number. Furthermore, the virtual pet will behave extremely affectionately if the new user has played with a virtual pet that has the same version number.

(9) If the D history index calculated from the received card-side history file is less than a certain value, the virtual pet 100 of the present invention may notify the user of its functions and handling. For example, the virtual pet 100 may light a red lamp and play audio that explains, "The red lamp means I'm angry." The virtual pet 100 may wag the tail unit 122 and play audio that explains "I wag my tail to show when I'm happy."

Also, the virtual pet 100 may progressively simplify the explanation of handling and functions according to the calculated D history index value.

In the case where the virtual pets store series numbers and version numbers as described in variation 8, the series numbers and version numbers are included in addition to the type information in the pet history tables that constitute the card-side history files.

In this case, the virtual pet 100 notifies an explanation of handling and functions if none of the pet history tables that constitute the card-side history file include the same series number and version number as the virtual pet 100.

If there is a pet history table that includes the same series number but a different version number, the virtual pet 100 notifies only an explanation of aspects different from the virtual pet with the version number included in the history table.

No explanation is notified if there is a pet history table that includes the same series number and version number.

(10) Although described heretofore as a virtual pet, the present invention is not limited to this. The present invention may be a nursing-care robot or an industrial robot. Furthermore, the present invention may be a general electrical device.

The present invention acquires a card-side history file from a user in possession of a memory card and who wants to operate the device, and judges to what extent the user has experience operating this device or a device of the same type, whereby, as described in variation 9, functions and handling are explained to a novice user, and the explanation is omitted for a proficient user.

Furthermore, the present invention may include probability adjustment tables that correspond to levels of operation experience, and the present invention may operate according to the operational experience of the user. Using the nursing-care robot and the industrial robot as examples, the present invention will take behavior appropriate for novice users, such as slowing the overall operating speed, leaving an interval between operations, and giving voice notifications of the next button, lever, etc. to operate if the user is a novice. If being used by a proficient user, the present invention will take behavior appropriate proficient users, such as increasing the operating speed and moving quickly from operation to operation.

(11) Although the virtual pet 100 stores four types of probability adjustment tables in the above embodiment, alternatively, the transition probabilities may be modified using mathematical functions.

(12) Also, the information that constitutes the pet history tables and user history tables described in the above embodiment is one example, and the present invention is not limited to this.

For example, an elapsed time may be measured when the user is playing with the virtual pet 100, and the information may include a cumulative playing time, being an accumulation of measured times. Instead of a joy index, there may be a cumulative joy index that is an accumulation of joy indexes when playing has ended.

Also, the structure of the card-side history file and the pet-side history file are not limited to this. For example, one history table may be generated with each communication, and these may be accumulated.

(13) Although the user holds a contactless IC card storing at least a card ID while playing with the virtual pet 100 in the above embodiment, the IC card need not be a contactless IC card. For example, the IC card may be a contact type IC card, whereby the user loads the IC card into the virtual pet 100 when playing, and removes the IC card when playing is finished. The recording medium is not limited to a memory card. Another recording medium may be used.

Also, the recording medium may be wire-connected to the virtual pet 100, or the recording medium may be a recording medium loadable into a mobile phone, PDA, etc., and a communication function of the loaded device may be used to perform communication with the virtual pet 100.

(14) Also, the memory card may be a recording device that includes a storage function, a communication function, a power source and a simple button operation unit. In this case, the user operates a button to start device authentication from the recording device side.

Also, the memory card may be a recording device shared by a plurality of users. In this case, a user inputs, before using the recording device, a user ID that is assigned per user. The recording device transmits the user ID instead of the card ID to the virtual pet 100. The user history tables stored by the virtual pet 100b are structured to include user IDs instead of card IDs. Also, if able to write history information like the memory card 300b, the recording device stores a plurality of card-side history files that are associated with the user IDs, and transmits a card-side history file associated with the inputted user ID when a history request is received.

Also, the communication function here is not limited to wireless communication. The recording device may be wire-connected to the virtual pet 100.

(15) In embodiment 1, the virtual pet 100b judges that the user in possession of the memory card 300a has finished playing with the virtual pet 100b if the input interval from the pressure sensor 144a of the head unit is greater than or equal to the contact interval of 60 seconds. Instead, however, the virtual pet 100b may output communication confirmation information to confirm whether communication is possible, and judge that playing has finished if a response to this is not received from the memory card.

(16) Also, in the present invention, the hint output device may have stored therein, as the device hint information, device identification information that is unique to the hint output device, at least one of the pieces of control information may include the device identification information, the acquisition unit may acquire the device identification information from the hint output device, and the selection unit may select the piece of control information that includes the device identification information acquired by the acquisition unit.

Although conventional technology discloses a robot that identifies users by facial recognition and voice recognition and selects a behavior pattern according to the identified user, it is necessary to include a high-performance imaging system and analysis system to perform accurate identification. In the structure of the present invention, the selection unit selects control information that corresponds to the device identification information, and the robot behaves according to the device identification information. Consequently, the present invention can select appropriate control information without having a high-performance imaging system or analysis system, unlike the conventional technology.

(17) The hint output device may have stored therein, as the device hint information, user information pertaining to a user in possession of the hint output device; and in the robot of the present invention, at least one of the pieces of control information may include the user information, the acquisition unit may acquire the user information from the hint output device, and the selection unit may select the piece of control information that includes the user information acquired by the acquisition unit.

According to this structure, at least one of the pieces of control information includes the user information, thereby allowing the selection unit to quickly and precisely select the appropriate control information using the user information.

(18) Also, the hint output device may have stored therein, as the device hint information, contact information that shows previous contact between the hint output device and the robot, the acquisition unit included in the robot may acquire the contact information from the hint output device, and the selection unit may select the piece of control information based on the acquired contact information.

According to this structure, the robot of the present invention can perform behavior that reflects contact information from previous contact between the hint output device and the robot of the present invention.

(19) Also, in the robot of the present invention, the contact information may be a contact count that shows a number of times of previous contact between the hint output device and the robot, each of the pieces of control information may be associated with a different one of ranges of contact counts, the acquisition unit may acquire the contact count from the hint output device, and the selection unit may select the piece of control information that is associated with a range, from among the ranges of contact counts, that includes the acquired contact count.

In this structure, the selection unit can easily and quickly select control information based on whether or not the contact count ranges corresponding to the pieces of control information include the contact count acquired by the selection unit. Also, the robot of the present invention can select appropriate behavior according to the contact count.

(20) The contact information may be a contact date-time that shows a most recent time of contact between the hint output device and the robot, each of the pieces of control information may be associated with a different one of ranges of elapsed time from the contact date-time, the acquisition unit included in the robot of the present invention may acquire the contact date-time from the hint output device, and the selection unit may calculate an elapsed time from the acquired contact date-time, and select the piece of control information associated with a range, from among the ranges of elapsed time, that includes the calculated elapsed time.

According to this structure, the robot can perform appropriate behavior since the selection unit selects appropriate control information according to the

(21) Also, the contact information may be an emotion index that shows a virtual emotion which occurred in the robot as a result of external factors and internal factors during the previous contact between the hint output device and the robot; and in the robot, each of the pieces of control information may be associated with a different one of ranges of emotion indexes, the acquisition unit may acquire the emotion index from the hint output device, and the selection unit may select the piece of control information associated with a range, from among the ranges of emotion indexes, that includes the acquired emotion index.

According to this structure, the robot of the present invention can perform behavior which reflects the emotion index that occurred in the robot during previous contact with the hint output device since the selection unit selects appropriate control information according to the emotion index.

(22) Also, the robot may further include a transmission unit operable, during contact between the hint output device and the robot, to periodically transmit, to the hint output device, newest contact information that shows the contact, wherein the hint output device receives the newest contact information and updates the contact information using the received newest contact information.

In this structure, the transmission unit transmits the latest contact information to the hint output device, and the hint output device updates the contact information using the latest contact information. Consequently, assuming that the acquisition unit of the robot acquires updated contact information when there is contact between the hint output device and the robot, the current contact between the robot and the user can impact the next instance of contact between the hint output device and the robot.

(23) Also, the hint output device may have stored therein, as the device hint information, contact information that shows contact between the hint output device and another robot, the acquisition unit included in the robot may acquire the contact information from the hint output device, and the selection unit may select the piece of control information according to the contact with the another robot shown by the acquired contact information.

According to this structure, the robot of the present invention can perform appropriate behavior that corresponds to the contact information since the selection unit selects appropriate control information using the contact information.

(24) In the robot of the present invention, the selection unit may hold in advance attribute information that shows a type of the robot, the contact information may include other attribute information that shows a type of the another robot, and the selection unit may select the piece of control information based on whether the other attribute information acquired by the acquisition unit matches the held attribute information.

According to this structure, the selection unit can select appropriate control information according to whether or not there has been contact with a same type robot.

(25) The hint output device may have stored therein, as the device hint information, attribute information that shows a type of a contacted robot with which the hint output device has previously been in contact, and a contact count; and in the present invention, one of the pieces of control information stored by the storage unit may be explanation control information that defines a behavior of notifying the user of a function and a handling method of the robot, and the selection unit may hold in advance a predetermined threshold and attribute information that shows a type of the robot, and select the explanation control information if the acquired device hint information indicates that the contact count, being a number of times of contact between the robot and a robot with a same type, is less than the predetermined threshold.

In this structure, the robot notifies the user of its functions and handling if the device hint information shows that the contact count between the robot and a same type robot is less than the predetermined threshold. As a result, the robot of the present invention notifies its functions and handling to the user in possession of the hint output device if he is not used to handling the same type of robot, thereby easily informing a novice user how to handle the robot without having to take out an instruction manual. Also, explaining handling in advance to users not familiar with the robot makes it possible to avoid malfunctions due to misuse.

(26) The device hint information may be device identification information that is unique to the hint output device, the robot may further include a contact information storage unit operable to store therein contact information that shows contact between the hint output device and the robot, in association with the device identification information, and the selection unit may read, from the contact information storage unit, the contact information associated with the device identification information that was acquired by the acquisition unit, and select the piece of control information using the read contact information.

In this structure, the robot includes a contact storage unit which stores contact information that shows contact between the robot and the user in possession of the hint output device. Consequently, even if the hint output device is a read-only device and new information cannot be written, the robot stores the contact information in the contact storage unit, thereby enabling it to perform behavior that reflects the contact information.

(27) The contact information storage unit may have stored therein a contact count as the contact information, the contact count being a number of times of previous contact between the hint output device and the robot; and in the robot of the present invention, each of the pieces of control information may be associated with a range of contact counts, and the selection unit may read the contact count from the contact information storage unit, and select the piece of control information associated with a range, from among the ranges of contact counts, that includes the read contact count.

In this structure, the selection unit can easily and quickly select control information based on whether or not the contact count ranges corresponding to the pieces of control information include the acquired contact count. Also, the robot of the present invention can select appropriate behavior according to the contact count.

(28) Also, the contact information storage unit included in the robot of the present invention may have stored therein, as the contact information, a most recent contact date-time between the hint output device and the robot, each of the pieces of control information may be associated with a range of elapsed time from the contact date-time, and the selection unit may read the contact date-time from the contact information storage unit, calculate an elapsed time from the read contact date-time, and select the piece of control information associated with a range, from among the ranges of elapsed time, that includes the calculated elapsed time.

In this structure, the selection unit selects appropriate control information depending on the acquired elapsed time, whereby the robot of the present invention can perform appropriate behavior according to the elapsed time.

(29) Also, the contact information storage unit included in the robot of the present invention may have stored therein, as the contact information, an emotion index that shows a virtual emotion which occurred in the robot as a result of external factors and internal factors during the previous contact between the hint output device and the robot, each of the pieces of control information may be associated with a range of emotion indexes, and the selection unit may read the emotion index from the contact information storage unit, and select the piece of control information associated with a range, from among the ranges of emotion indexes, that includes the read emotion index.

According to this structure, the robot can perform appropriate behavior which reflects the emotion index that occurred in the robot during previous contact with the hint output device.

(30) Also, in the present invention, the device hint information stored by the hint output device may include device identification information that is unique to the hint output device, the robot may further include a contact information storage unit operable to store therein contact information that shows contact between the robot and another hint output device, in association with other device identification information that is unique to the another hint output device, and the selection unit may select the piece of control information based on the contact information if the acquired device identification information and the other device identification information do not match.

According to this structure, since the contact information storage unit stores the contact information in association with the other device identification information unique to the other hint output device, the selection unit can easily and accurately determine whether to use the contact information in the selection by comparing the acquired device identification information and the other device identification information.

(31) In the present invention, the device hint information may include, in addition to the device identification information, user information pertaining to a user in possession of the hint output device, the contact information may include other user information pertaining to a user in possession of the another hint output device, and the selection unit may select the piece of control information based on whether the other user information included in the contact information matches the user information acquired by the acquisition unit.

According to this structure, the selection unit can select appropriate control information based on whether the other user information included in the contact information matches user information acquired by the acquisition unit.

(32) The robot of the present invention may further include an end judgment unit operable to judge an end of contact between the hint output device and the robot, wherein from selection by the selection unit until the end judgment unit judges the end of contact, the drive control unit drive-controls the drive unit using the selected piece of control information.

According to this structure, the robot of the present invention performs behavior suggested by the device hint information from when the selection is made by the selection unit until the judgment by the end judgment unit is affirmative. As a result of this, even if the acquisition unit acquires other device hint information output by another hint output unit during contact between the hint output device and the robot, the robot continues to perform the behavior suggested by the device hint information that was acquired from the hint output device, until the judgment unit judges in the affirmative. Consequently, the robot continues to perform behavior that satisfies the user in possession of the hint output device until the end judgment unit judges that playing has ended.

(33) The end judgment unit included in the robot of the present invention may include an output subunit operable to output, to the hint output device, communication confirmation information which confirms that communication is possible, a response acquisition subunit operable to acquire, from the hint output device, a reception response which shows that the communication confirmation information was received normally, and a judgment subunit operable to, if the reception response is not acquired normally by the response acquisition subunit, judge that contact between the hint output device and the robot has ended.

In this structure, the end judgment unit outputs the communication confirmation information and judges that playing has ended if the reception response is not received, thereby enabling an accurate judgment that playing has ended.

(34) The end judgment unit included in the robot of the present invention may include an acquisition subunit operable to acquire input information from an external source, a measuring subunit operable to measure elapsed time from acquisition of the input information, and a determination subunit operable to determine that contact between the hint output device and the robot has ended, if a second piece of input information is not acquired within a certain time period from acquisition of a first piece of input information.

If a second piece of input information is not acquired within a certain time period from acquisition of a first piece of input information, the determination subunit determines that contact between the hint output device and the robot has ended. When the user in possession of the hint output device uses the robot, it is conceivable that he will talk to the robot and touch the robot. Consequently, assuming that the acquisition subunit detects user actions such as speech or pressure as the input information, the determination subunit can accurately determine that contact has ended if a state in which user actions are not detected continues at least the certain time period. Also, the robot can continue to satisfy the user as long as the user is using the robot since the determination subunit determines that contact has ended when the user stops using the robot.

(35) The drive control unit included in the present invention may hold in advance a plurality of state transition tables that are based on a finite probability automaton, and after the selection by the selection unit, perform the drive-control using the plurality of state transition tables and the selected piece of control information. The plurality of state transition tables may be constituted from transition probabilities, each of which is a probability of transition from a node associated with the state transition table to another node, each of the pieces of control information stored by the storage unit may define a variation amount for a different one of the transition probabilities that constitute the state transition tables, and the drive control unit may increase or decrease the transition probabilities that constitute the state transition tables in accordance with a variation amount defined by the selected piece of control information, and perform the drive-control using the resultant state transition tables.

In this structure, the drive control unit can easily drive-control the drive unit so that the robot performs behavior suggested by the hint information by simply increasing or decreasing the transition probabilities that constitute the state transition tables in accordance with the variation amounts defined by the selected control information.

(36) The present invention is a hint output device that makes contact with a robot which behaves autonomously, including a storage unit operable to store therein device hint information that suggests any one of a plurality of behaviors of the robot; and an output unit operable to read the device hint information from the storage unit, and output the read device hint information to the robot.

According to this structure, the hint output device outputs, to the robot, device hint information that suggests any one of the plurality of the robot's behaviors, and the robot performs behavior that will satisfy the user based on the device hint information without receiving detailed instructions. Consequently, the user can make the robot perform desired behavior by simply being in possession of the hint output device when in contact with the robot.

(37) In the hint output device of the present invention, the storage unit may have stored therein, as the hint information, contact information that shows previous contact between the hint output device and the robot, during contact with the hint output device, the robot may output, to the hint output device, latest contact information that shows the contact, and an update instruction that instructs updating of the contact information, and the hint output device may further include an acquisition unit operable to acquire the latest contact information and the update instruction, and an update unit operable to update, in accordance with the update instruction, the device hint information using the latest contact information.

In this structure, the acquisition unit acquires the latest contact information, and the update unit updates the contact information. Consequently, assuming that the output unit will output updated contact information the next time the hint output device is in contact with the robot, the hint output device can cause the next instance of contact with the robot to be impacted by the current contact with the robot.

(38) The devices of the abovementioned embodiment 1 and variations may be computer systems structured specifically from a microprocessor, ROM, RAM, a hard disk unit, a display unit, a keyboard, a mouse, etc. A computer program is stored in the RAM or the hard disk unit. The devices achieve their functions as the microprocessor operates in accordance with the computer program. Instruction code which indicates commands to the computer is structured as a combination of multiple instruction codes since the computer program achieves predetermined functions.

(39) A portion or all of the structure elements of the devices of the aforementioned embodiment 1 and variations may be structured as a single system LSI (Large Scale Integration). A system LSI is a super multifunctional LSI manufactured by integrating multiple structural units onto a single chip. Specifically, it is a computer system including a microprocessor, ROM, and RAM. A computer program is stored in the RAM. The system LSI achieves its functions as the microprocessor operates in accordance with the computer program.

(40) A portion or all of the structure elements of the devices of the abovementioned embodiment 1 and variations may be structured as a removable IC card or stand-alone module. The IC card or the module would be a computer system including a microprocessor, ROM, and RAM. The IC card and the module may also include the above super multifunctional LSI. The IC card and the module achieve their functions as the microprocessor operates in accordance with the computer program. This IC card or module may be tamper resistant.

(41) The present invention may be the methods shown above. Also, the present invention may be computer programs for causing computers to realize the methods, or may be digital signals representing the computer programs.

Also, the present invention may be a computer-readable recording medium such as a flexible disk, a hard disk, a CD-ROM, an MO, a DVD, a DVD-ROM, a DVD-RAM, a BD (Blu-ray Disc), or a semiconductor memory on which the computer programs or the digital signals are recorded. The present invention may be the computer programs or the digital signals which are recorded on these recording media.

Also, the present invention may be the computer programs or digital signals which are transmitted via an electronic communications circuit, a wireless or fixed-line communications circuit, a network acting as an internet, a data broadcast, etc.

Also, the present invention may be a computer system including a microprocessor and a memory, whereby the memory stores the computer program, and the microprocessor operates in accordance with the computer program.

Also, the present invention may be carried out by another independent computer system by transferring the program or the digital signals which have been recorded on the recording media, or by transferring the program or the digital signals via the network, etc.

(42) The above embodiment and the above variations may be combined.

The present invention can be used economically as well as continuously and repeatedly in industries that manufacture and sell various types of robots, including pet robots, and electrical apparatuses; industries that develop and sell software for these robots and electrical apparatuses, industries that manufacture and sell recording devices used together with these robots and electrical apparatuses; and industries that use these robots and electrical apparatuses to provide various services including product manufacturing and amusement.

The invention claimed is:

1. A robot that behaves autonomously while in contact with a user, the robot comprising:
   a drive unit;
   a storage unit operable to store a plurality of pieces of control information, each piece of control information of the plurality of pieces of control information defining a respective behavior of a plurality of behaviors of the robot;
   an acquisition unit operable to acquire, from a hint output device that provides a behavior hint to the robot, device hint information that suggests any behavior of the plurality of behaviors;
   a selection unit operable to select, from among the plurality of pieces of control information stored by the storage unit, a piece of control information that defines the behavior suggested by the acquired device hint information; and
   a drive control unit operable to control, based on the selected piece of control information, the drive unit such that the robot performs the behavior defined by the selected piece of control information,
   wherein the hint output device stores, as the device hint information, contact information indicating a contact between the hint output device and another robot,
   wherein the acquisition unit acquires the contact information from the hint output device, and
   wherein the selection unit selects the piece of control information according to the contact between the hint output device and the another robot indicated by the acquired contact information.

2. The robot of claim 1,
   wherein the hint output device stores, as the device hint information, device identification information that is unique to the hint output device,
   wherein at least one piece of control information of the plurality of pieces of control information includes the device identification information,
   wherein the acquisition unit acquires the device identification information from the hint output device, and
   wherein the selection unit selects the at least one piece of control information that includes the device identification information acquired by the acquisition unit.

3. The robot of claim 1,
   wherein the hint output device stores, as the device hint information, user information pertaining to a user in possession of the hint output device,
   wherein at least one piece of control information of the plurality of pieces of control information includes the user information,
   wherein the acquisition unit acquires the user information from the hint output device, and
   wherein the selection unit selects the at least one piece of control information that includes the user information acquired by the acquisition unit.

4. The robot of claim 1,
   wherein the contact information indicates a previous contact between the hint output device and the robot,
   wherein the acquisition unit acquires, from the hint output device, the contact information indicating the previous contact between the hint output device and the robot, and
   wherein the selection unit selects the piece of control information based on the acquired contact information indicating the previous contact between the hint output device and the robot.

5. The robot of claim 4,
   wherein the contact information is a contact count value indicating a number of times of previous contact between the hint output device and the robot,
   wherein each piece of control information of the plurality of pieces of control information is associated with a different range of the contact count value of a plurality of ranges of the contact count value,
   wherein the acquisition unit acquires the contact count value from the hint output device, and
   wherein the selection unit selects a piece of control information of the plurality of pieces of control information that is associated with a range, from among the plurality of ranges of the contact count value, that includes the acquired contact count value.

6. The robot of claim 4,
   wherein the contact information is a contact date-time indicating a most recent time of contact between the hint output device and the robot,
   wherein each piece of control information of the plurality of pieces of control information is associated with a different range of elapsed time from the content date-time of a plurality of ranges of the elapsed time from the contact date-time,
   wherein the acquisition unit acquires the contact date-time from the hint output device, and
   wherein the selection unit calculates an elapsed time from the acquired contact date-time, and selects a piece of control information of the plurality of pieces of control information that is associated with a range, from among the plurality of ranges of the elapsed time, that includes the calculated elapsed time.

7. The robot of claim 4,
wherein the contact information is an emotion index indicating a virtual emotion that occurred in the robot as a result of external factors and internal factors during the previous contact between the hint output device and the robot,
wherein each piece of control information of the plurality of pieces of control information is associated with a different range of the emotion index of a plurality of ranges of the emotion index,
wherein the acquisition unit acquires the emotion index from the hint output device, and
wherein the selection unit selects a piece of control information of the plurality of pieces of control information that is associated with a range, from among the plurality of ranges of the emotion index, that includes the acquired emotion index.

8. The robot of claim 4, further comprising a transmission unit operable, during the contact between the hint output device and the robot, to periodically transmit, to the hint output device, newest contact information indicating the contact between the hint output device and the robot,
wherein the hint output device receives the newest contact information and updates the contact information stored therein using the received newest contact information.

9. The robot of claim 1,
wherein the selection unit holds in advance attribute information indicating type of the robot,
wherein the contact information includes other attribute information indicating a type of the another robot, and
wherein the selection unit selects the piece of control information based on whether the other attribute information included in the contact information acquired by the acquisition unit matches the attribute information held by the selection unit.

10. The robot of claim 1,
wherein the hint output device stores, as the device hint information, (i) attribute information indicating a type of a contacted robot with which the hint output device has previously been in contact, and (ii) a contact count value,
wherein one piece of control information of the plurality of pieces of control information stored by the storage unit is explanation control information that defines a behavior of notifying the user of a function and a handling method of the robot, and
wherein the selection unit holds in advance a predetermined threshold and attribute information indicating a type of the robot, and selects the explanation control information when the acquired device hint information indicates that the contact count value, which indicates a number of times of contact between the robot and a robot of a same type, is less than the predetermined threshold.

11. The robot of claim 1,
wherein the device hint information is device identification information that is unique to the hint output device,
wherein the robot further comprises a contact information storage unit operable to store contact information indicating a contact between the hint output device and the robot, the contact information indicating the contact between the hint output device and the robot being stored in association with the device identification information, and
wherein the selection unit reads, from the contact information storage unit, the contact information associated with the device identification information acquired by the acquisition unit as the device hint information, and selects the piece of control information using the contact information read from the contact information storage unit.

12. The robot of claim 11,
wherein the contact information storage unit stores a contact count value as the contact information stored therein, the contact count value indicating a number of times of previous contact between the hint output device and the robot,
wherein each piece of control information of the plurality of pieces of control information is associated with a range of the contact count value of a plurality of ranges of the contact count value, and
wherein the selection unit reads the contact count value from the contact information storage unit, and selects a piece of control information of the plurality of pieces of control information that is associated with a range, from among the plurality of ranges of the contact count value, that includes the read contact count value.

13. The robot of claim 11,
wherein the contact information storage unit stores, as the contact information stored therein, a contact date-time between the hint output device and the robot,
wherein each piece of control information of the plurality of pieces of control information is associated with a range of elapsed time from the contact date-time of a plurality of ranges of elapsed time from the contact date-time, and
wherein the selection unit reads the contact date-time from the contact information storage unit, calculates an elapsed time from the read contact date-time, and selects a piece of control information of the plurality of pieces of control information that is associated with a range, from among the plurality of ranges of elapsed time, that includes the calculated elapsed time.

14. The robot of claim 11,
wherein the contact information storage unit stores, as the contact information stored therein, an emotion index indicating a virtual emotion that occurred in the robot as a result of external factors and internal factors during a previous contact between the hint output device and the robot,
wherein each piece of the control information of the plurality of pieces of control information is associated with a range of the emotion index of a plurality of ranges of the emotion index, and
wherein the selection unit reads the emotion index from the contact information storage unit, and selects a piece of control information of the plurality of pieces of control information that is associated with a range, from among the plurality of ranges of the emotion index, that includes the read emotion index.

15. The robot of claim 1,
wherein the device hint information stored by the hint output device includes device identification information that is unique to the hint output device,
wherein the robot further includes a contact information storage unit operable to store contact information indicating a contact between the robot and another hint output device, the contact information indicating the contact between the robot and the another hint output device being stored in association with other device identification information that is unique to the another hint output device, and wherein the selection unit selects the piece of control information based on the contact information stored in the contact information storage unit, when the device identification information of the acquired device hint information and the other device identification information that is unique to the another hint output device do not match.

16. The robot of claim 15,
wherein the device hint information further includes user information pertaining to a user in possession of the hint output device,
wherein the contact information stored in the contact information storage unit includes other user information pertaining to a user in possession of the another hint output device, and
wherein the selection unit selects the piece of control information based on whether the other user information included in the contact information stored in the contact information storage unit matches the user information included in the device hint information acquired by the acquisition unit.

17. The robot of claim 1, further comprising an end judgment unit operable to judge an end of contact between the hint output device and the robot,
wherein, from the selection by the selection unit until the end judgment unit judges the end of contact between the hint output device and the robit, the drive control unit drive-controls the drive unit using the selected piece of control information.

18. The robot of claim 17, wherein the end judgment unit includes:
an output subunit operable to output, to the hint output device, communication confirmation information confirming that communication is possible;
a response acquisition subunit operable to acquire, from the hint output device, a reception response indicating that the communication confirmation information was received normally, and
a judgment subunit operable to, when the reception response is not acquired normally by the response acquisition subunit, judge that contact between the hint output device and the robot has ended.

19. The robot of claim 17, wherein the end judgment unit includes:
an acquisition subunit operable to acquire input information from an external source
a measuring subunit operable to measure an elapsed time from the acquisition of the input information from the external source; and
a determination subunit operable to determine that contact between the hint output device and the robot has ended, when a second piece of input information is not acquired within a certain time period from the acquisition of the input information from the external source.

20. The robot of claim 1,
wherein the hint output device is a contactless IC card storing the device hint information, and
wherein the acquisition unit acquires the device hint information from the contactless IC card by wireless communication.

21. The robot of claim 1,
wherein the drive control unit holds in advance a plurality of state transition tables that are based on a finite probability automaton, and wherein, after the selection by the selection unit, the drive control unit performs the drive-control using the plurality of state transition tables and the selected piece of control information.

22. The robot of claim 21,
wherein the plurality of state transition tables are constituted from a plurality of transition probabilities, each transition probability of the plurality of transition probabilities being a probability of transition from a node associated with a state transition table of the plurality of state transition tables to another node,
wherein each piece of control information of the plurality of pieces of control information stored by the storage unit defines a variation amount for a different transition probability of the plurality of transition probabilities that constitute the plurality of state transition tables, and
wherein the drive control unit increases or decreases the transition probabilities, of the plurality of transition probabilities, that constitute the plurality of state transition tables in accordance with a variation amount defined by the selected piece of control information, and performs the drive-control using resultant state transition tables.

23. A hint output device that makes a contact with a robot that behaves autonomously, the hint output device comprising:
a storage unit operable to store device hint information that suggests any behavior of a plurality of behaviors of the robot; and
an output unit operable to read the device hint information from the storage unit, and output the read device hint information to the robot
wherein the hint output device stores, as the device hint information, contact information indicating a contact between the hint output device and another robot,
wherein an acquisition unit of the robot acquires the contact information output from the output unit of the hint output device, and
wherein a selection unit of the robot selects a piece of control information of a plurality of pies of control information stored by the robot, the selection of the selection unit being made according to the contact between the hint output device and the another robot indicated by the acquired contact information.

24. The hint output device of claim 23,
wherein the contact information indicates a previous contact between the hint output device and the robot,
wherein, during the contact with the hint output device, the robot outputs, to the hint output device, latest contact information indicating the contact between the hint output device and the robot, and outputs an update instruction that instructs updating of the contact information, and
wherein the hint output device further comprises:
an acquisition unit operable to acquire the latest contact information and the update instruction and;
an update unit operable to update, in accordance with the update instruction, the device hint information using the latest contact information.

25. A robot control system comprising a robot that behaves autonomously and a hint output device that provides a behavior hint to the robot,
wherein the robot comprises:
a drive unit;
a storage unit operable to store a plurality of pieces of control information, each piece of control information of the plurality of pieces of control information defining a respective behavior of a plurality of behaviors of the robot;

an acquisition unit operable to acquire, from the hint output device, device hint information that suggests any behavior of the plurality of behaviors;

a selection unit operable to select, from among the plurality of pieces of control information stored by the storage unit, a piece of control information that defines the behavior suggested by the acquired device hint information; and a drive control unit operable to control, based on the selected piece of control information, the drive unit such that the robot performs the behavior defined by the selected piece of control information, wherein the hint output device comprises:

a hint storage unit operable to store the device hint information; and a transmission unit operable to read the device hint information from the hint storage unit, and transmit the read device hint information to the robot wherein the hint output device stores, as the device hint information, contact information indicating a contact between the hint output device and another robot, wherein the acquisition unit acquires the contact information from the hint output device, and wherein the selection unit selects the piece of control information according to the contact between the hint output device and the another robot indicated by the acquired contact information.

26. A robot control method used in a robot that behaves autonomously while in contact with a user, wherein the robot comprises:

a drive unit; and a storage unit operable to store a plurality of pieces of control information, each piece of control information of the plurality of pieces of control information defining a respective behavior of a plurality of behaviors of the robot wherein the robot control method comprises:

acquiring, from a hint output device that provides a behavior hint to the robot, device hint information that suggests any behavior of the plurality of behaviors;

selecting, from among the plurality of pieces of control information stored by the storage unit, a piece of control information that defines the behavior suggested by the acquired device hint information; and controlling, based on the selected piece of control information, the drive unit such that the robot performs the behavior defined by the selected piece of control information, wherein the hint output device stores, as the device hint information, contact information indicating a contact between the hint output device and another robot, wherein the acquiring acquires the contact information from the hint output device, and wherein the selecting selects the piece of control information according to the contact between the hint output device and the another robot indicated by the acquired contact information.

27. A computer-readable recording medium having a robot control program recorded thereon, the robot control program for being used in a robot that behaves autonomously while in contact with a user, wherein the robot comprises:

a drive unit; and a storage unit operable to store therein a plurality of pieces of control information, each piece of control information of the plurality of pieces of control information defining a respective behavior of a plurality of behaviors of the robot, wherein the robot control program causes a computer to execute a method comprising:

acquiring, from a hint output device that provides a behavior hint to the robot, device hint information that suggests any behavior of the plurality of behaviors;

selecting, from among the plurality of pieces of control information stored by the storage unit, a piece of control information that defines the behavior suggested by the acquired device hint information; and controlling, based on the selected piece of control information, the drive unit such that the robot performs the behavior defined by the selected piece of control information, wherein the hint output device stores, as the device hint information, contact information indicating a contact between the hint output device and another robot, wherein the acquiring acquires the contact information from the hint output device, and wherein the selecting selects the piece of control information according to the contact between the hint output device and the another robot indicated by the acquired contact information.

28. The computer-readable recording medium of claim 27, wherein the robot control program is transmitted and received via a telecommunications line.

29. An integrated circuit provided in a robot that behaves autonomously while in contact with a user, wherein the robot includes a drive unit, wherein the integrated circuit comprises:

a storage unit operable to store a plurality of pieces of control information, each piece of control information of the plurality of pieces of control information defining a respective behavior of a plurality of behaviors of the robot;

an acquisition unit operable to acquire, from a hint output device that provides a behavior hint to the robot, device hint information that suggests any behavior of the plurality of behaviors;

a selection unit operable to select, from among the plurality of pieces of control information stored by the storage unit, a piece of control information that defines the behavior suggested by the acquired device hint information; and a drive control unit operable to control, based on the selected piece of control information, the drive unit such that the robot performs the behavior defined by the selected piece of control information, wherein the hint output device stores, as the device hint information, contact information indicating a contact between the hint output device and another robot, wherein the acquisition unit acquires the contact information from the hint output device, and wherein the selection unit selects the piece of control information according to the contact between the hint output device and the another robot indicated by the acquired contact information.

* * * * *